(12) United States Patent
Nakazawa

(10) Patent No.: US 8,166,078 B2
(45) Date of Patent: Apr. 24, 2012

(54) DESIGN PROCESS RECORDING

(76) Inventor: Toshihiko Nakazawa, Tokyo (JP)

(*) Notice: Subject to any disclaimer, the term of this patent is extended or adjusted under 35 U.S.C. 154(b) by 344 days.

(21) Appl. No.: 12/532,389

(22) PCT Filed: Feb. 26, 2008

(86) PCT No.: PCT/JP2008/000342
§ 371 (c)(1),
(2), (4) Date: Sep. 21, 2009

(87) PCT Pub. No.: WO2008/117510
PCT Pub. Date: Oct. 2, 2008

(65) Prior Publication Data
US 2010/0030356 A1 Feb. 4, 2010

(30) Foreign Application Priority Data
Mar. 23, 2007 (JP) .................. 2007-075952

(51) Int. Cl.
*G06F 17/00* (2006.01)
(52) U.S. Cl. .......................... 707/803; 704/9
(58) Field of Classification Search ....... 704/9; 707/803
See application file for complete search history.

(56) References Cited

FOREIGN PATENT DOCUMENTS

| JP | 01286077 | 12/1989 |
|---|---|---|
| JP | 2004199418 | 7/2004 |

OTHER PUBLICATIONS

Requirement-Definition-Confirmation Model for the Enginnering Process Decomposition Toshihiko Nakazawa (in Japanese, with English abstract), Journal of Japan Society for Design Engineer, vol. 38, No. 1, Japan Society for Design Engineering, Dec. 5, 2003.
Requirement-Definition-Confirmation Modeling Approach for Identifying Uncertainties in Product Design Processes, Toshihiko Nakazawa and Hiroshi Masuda; Proceedings of IDETC/CIE 2006 ASME 2006 International Design Engineering Technical Conferences & Computers and Information in Engineering Conference Sep. 10-13, 2006, Philadelphia, Pennsylvania, USA.

*Primary Examiner* — Belix M Ortiz
(74) *Attorney, Agent, or Firm* — Cowan, Liebowitz & Latman, P.C.; Mark Montague, Esq.

(57) ABSTRACT

Description of works such as "requirement", "definition", and "confirmation" in the narrow sense in a design process is made possible. A design work recording unit (22a) records in a data storage device (6) an inputted "design work name" as one of "external requirement name", "concept definition name", "internal requirement name", "detailed definition name", and so on. An inter-work relation recording unit (22b) records in the data storage device (6) a relation between two "design work names" selected from "external requirement name", "concept definition name", "internal requirement name", "detailed definition name", and so on recorded in the data storage device (6). Here, the inter-work relation recording unit (22b) records a relation between "external requirement name" and "concept definition name", a relation between "concept definition name" and "internal requirement name", a relation between "internal requirement name" and "detailed definition name", and so on.

8 Claims, 28 Drawing Sheets

FIG. 12A

| | CONCEPT DEFINITION NAME A | CONCEPT DEFINITION NAME B | CONCEPT DEFINITION NAME C | CONCEPT DEFINITION NAME D |
|---|---|---|---|---|
| EXTERNAL REQUIREMENT NAME A | 1 | 1 | 0 | 0 |
| EXTERNAL REQUIREMENT NAME B | 0 | 0 | 0 | 1 |
| EXTERNAL REQUIREMENT NAME C | 0 | 1 | 0 | 0 |
| EXTERNAL REQUIREMENT NAME D | 0 | 0 | 0 | 0 |

FIG. 12B

| EXTERNAL REQUIREMENT NAME A | CONCEPT DEFINITION NAME A |
|---|---|
| EXTERNAL REQUIREMENT NAME A | CONCEPT DEFINITION NAME B |
| EXTERNAL REQUIREMENT NAME B | CONCEPT DEFINITION NAME D |
| EXTERNAL REQUIREMENT NAME C | CONCEPT DEFINITION NAME B |
| EXTERNAL REQUIREMENT NAME D | NULL |
| NULL | CONCEPT DEFINITION NAME C |

FIG. 16
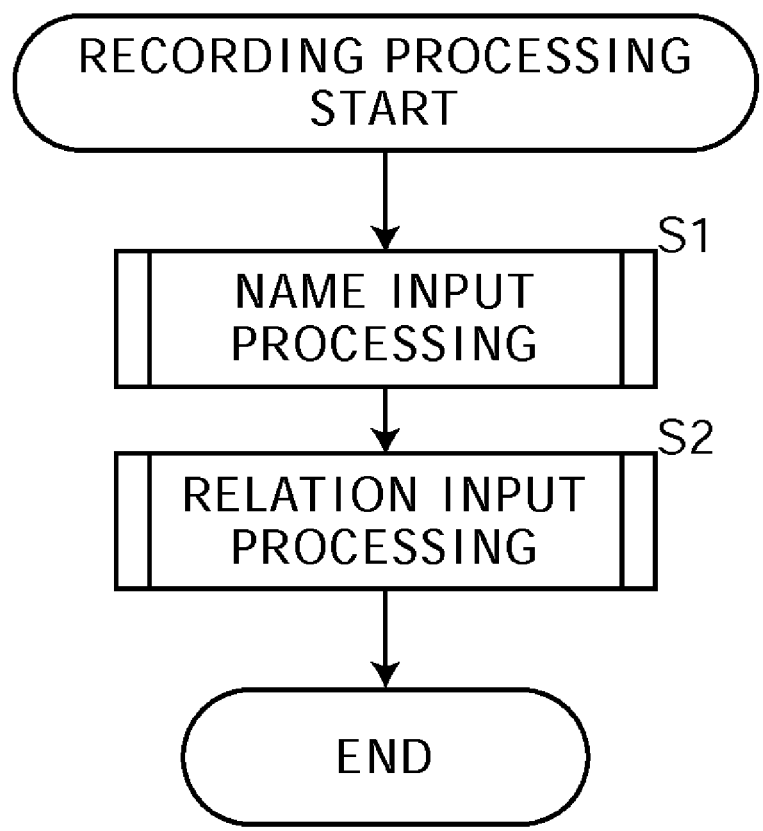
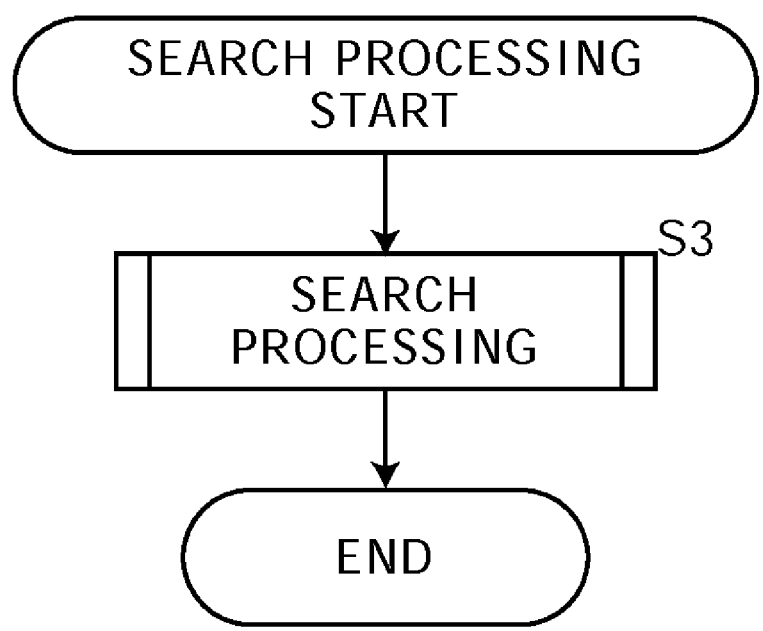

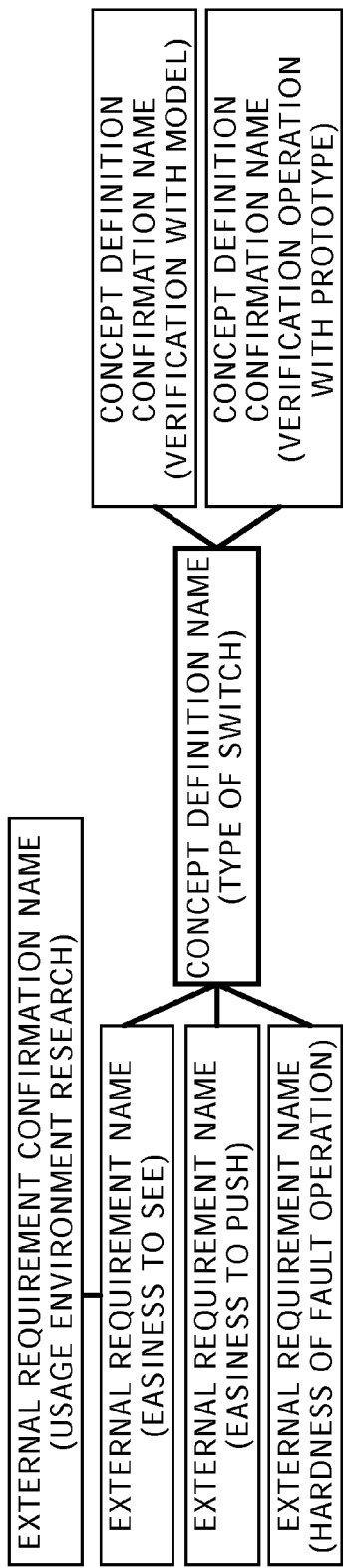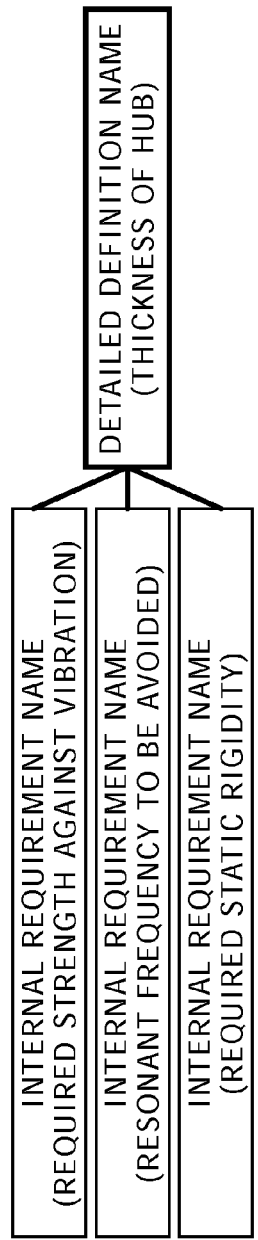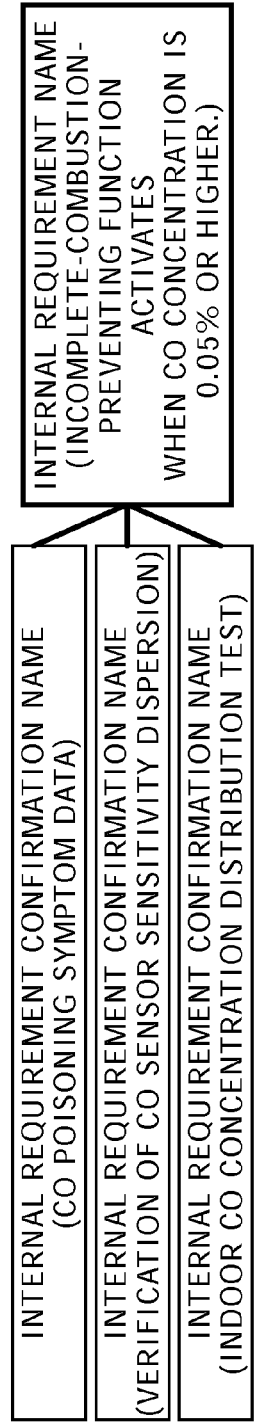

FIG. 22A

| PRODUCT NAME | ADAPTATION OBJECT |
|---|---|
| SWITCH | USAGE ENVIRONMENT |

| PRODUCT NAME | ADAPTATION OBJECT |
|---|---|
| SWITCH | USAGE ENVIRONMENT |
| | |

| PRODUCT NAME | ADAPTATION OBJECT |
|---|---|
| SWITCH | USAGE ENVIRONMENT |
| | USER |
| | DEVICE USING THIS |
| | PRODUCTION PROCESS |

FIG. 22D

| PRODUCT NAME | ADAPTATION OBJECT (LEVEL 1) | ADAPTATION OBJECT (LEVEL 2) |
|---|---|---|
| SWITCH | USAGE ENVIRONMENT | |
| | USER | |
| | DEVICE USING THIS | |
| | PRODUCTION PROCESS | |

| PRODUCT NAME | ADAPTATION OBJECT (LEVEL 1) | ADAPTATION OBJECT (LEVEL 2) |
|---|---|---|
| SWITCH | USAGE ENVIRONMENT | |
| | USER | |
| | DEVICE USING THIS | |
| | PRODUCTION PROCESS | RESIN FORMATION STEP |

FIG. 22F

| PRODUCT NAME | ADAPTATION OBJECT (LEVEL 1) | ADAPTATION OBJECT (LEVEL 2) | ADAPTATION OBJECT (LEVEL 3) |
|---|---|---|---|
| SWITCH | USAGE ENVIRONMENT | | |
| | USER | | |
| | DEVICE USING THIS | | |
| | PRODUCTION PROCESS | RESIN FORMATION STEP | INDICATION PLATE FORMING STEP |
| | | | KNOB FORMING STEP |
| | | PRESSING STEP | |
| | | MECHANICAL PROCESSING STEP | |
| | | SURFACE PROCESSING STEP | |
| | | ASSEMBLY STEP | |

DESIGN PROCESS RECORDING

CROSS-REFERENCE TO RELATED APPLICATIONS

This application is a national stage application of International Application No. PCT/JP2008/000342, filed Feb. 26, 2008, whose benefit is claimed and which claims the benefit of Japanese Patent Application No. 2007-075952, filed Mar. 23, 2007.

FIELD OF THE INVENTION

The present invention relates to design process recording.

BACKGROUND OF THE INVENTION

In the field of product designing, a person skilled in designing creates specifications which are considered optimum for a certain design object based on knowledge, his/her patterns of thinking, and so on obtained from long years of experience.

In late years, it is concerned that the majority of such knowledge or the like in a design process will be lost accompanying retirements of such skilled persons. Accordingly, there are several attempts to transform skilled persons' knowledge and so on into data. However, the design process may be repeated due to trial and error, change of requirement, and/or the like, and thus the design process is difficult to be described appropriately by a conventional process description method of sequential execution type.

Accordingly, the present inventor has suggested a method of modeling a product development process for automobiles, home electric appliances, and the like, as one of attempts to provide a platform for transforming a working (thinking) process when designing by such skilled persons or the like into data (see, for example, Non-patent document 1). In Non-patent document 1, on the basis of "designing" as a work of deciding the shape, structure, or the like of a product in a series of product development processes, which are "plan", "design", "designing", "test/verification", "production preparation", and "production", the "plan" and "design", which are upstream works of "designing", are ranked as work processes for deciding requirements for "designing". The "test/verification" and "production preparation", which are downstream works of "designing", are ranked as work processes for verifying the functionality and productivity of contents decided in design works. The designing, the upstream of designing, and the downstream of designing are assumed as three processes: (a) work of recognizing requirements for designing, (b) designing definition work, and (c) verification work of designing, and individual works forming them are assumed as (a) "requirement", (b) "definition", and (c) "confirmation" respectively, whereby a method of describing these works and relations between works is proposed as RDC model.

Non-patent document 1: "Requirement Definition Confirmation Model for the Engineering Process Decomposition", Toshihiko Nakazawa, Journal of Japan Society for Design Engineering, Vol. 38, No. 12, December Issue, 2003.

The RDC model can solve difficulties that occur when describing a production development process including trial-and-error and circulation of works by a conventionally existing expression method of sequential processing type such as a flowchart. However, the RDC model is developed for capturing explicit works in product development processes, and thus design process recording, as a part thereof, involves many oversights.

A major part of product development is a process of "designing". Furthermore, a major part of works of designing is an intellectual activity performed in designer's mind. This process is performed along with progress of designing, and will be lost without remaining as a record. In such an implicit design process, there exist sections of: recognition of requirements (recognition of requirement specifications or the like) that is "requirement" in the narrow sense; design definition work (deciding the shape and structure of a product) that is "definition" in the narrow sense; and verification work (verification with drawing, calculation, and CAE analysis, or the like) that is "confirmation" in the narrow sense. However, in the RDC model, the "requirement", "definition", and "confirmation" in the broad sense in the aforementioned product development process and the "requirement", "definition", and "confirmation" in the narrow sense in the design process are considered without distinction. Works such as the "requirement", "definition", and "confirmation" in the narrow sense in this design process are mostly performed unconsciously by a designer, and it is difficult by the conventional RDC model to sort out such unrecognized works.

For example, as shown in FIG. 28, when there is a design process of deciding a definition 202 that a certain part is "fixed with four screws" so as to satisfy a requirement 201 "not coming off when dropped", the designer can recognize relatively easily that there exists a design process of "deciding the number of screws".

However, when thinking logically, before a work of deciding the number of screws (definition 202) there ought to be processes such as a work of "selecting an optimum fixing method" like a work 203 of "adopting screws as a fixing method", and a work of "grasping requirements for the fixing method to satisfy" such as a work 204 of "recognizing that the part does not come off when pulled with a static load of 100 N", so as to satisfy the requirement 201.

However, when the designer thinks it is a matter of course to use screws to fix this part (for the reason that it has been so in conventional products), there occurs a situation that decision making to use the screws is performed without being recognized. In such a situation, in the RDC model, the process of "deciding an optimum fixing method" is not recorded clearly.

There may further exist many design processes in which the designer decides a structure and shape of a product directly from vague requirements. For example, in the above-described example of fixing a part, the "number of screws" is decided immediately from the requirement "not coming off when dropped". Normally, in this example, a process of deciding the fixing force of the part should exists before deciding the type and the number of screws. In this manner, in a design process that should be elaborate, there exist many rough decision making works, and it can be imagined that such rough processes deteriorate the quality of design. However, in the RDC model, it is difficult to recognize, faithfully and reliably, implicit works as described above.

The present invention is made in view of the above-described problems, and an object thereof is to obtain a design process recording apparatus which allows to describe works which are not recorded in the RDC model, such as "requirement", "definition", and "confirmation" in the narrow sense in a design process, a data structure, a computer program, and a design process recording method for recording design processes by a designer as data.

SUMMARY OF THE PRESENT INVENTION

To solve the above-described problems, the present invention provides as follows.

A design process recording apparatus according to the present invention includes a design work recording means for recording in a recording medium an inputted design work name as one of plural types of design work names including external requirement names, concept definition names, internal requirement names, detailed definition names, external requirement confirmation names, concept definition confirmation names, internal requirement confirmation names, and detailed definition confirmation names, and an inter-work relation recording means for recording in the recording medium a relation between two design work names selected from one or more of the external requirement names, one or more of the concept definition names, one or more of the internal requirement names, one or more of the detailed definition names, one or more of the external requirement confirmation names, one or more of the concept definition confirmation names, one or more of the internal requirement confirmation names, and one or more of the detailed definition confirmation names recorded in the recording medium. The inter-work relation recording means records a relation between the external requirement name and the concept definition name, a relation between the concept definition name and the internal requirement name, a relation between the internal requirement name and the detailed definition name, a relation between the external requirement name and the internal requirement name, a relation between the external requirement name and the external requirement confirmation name, a relation between the concept definition name and the concept definition confirmation name, a relation between the internal requirement name and the internal requirement confirmation name, and a relation between the detailed definition name and the detailed definition confirmation name.

Further, a design process recording apparatus according to the present invention may be arranged as follows in addition to the above-described design process recording apparatus. Specifically, a user interface processing means changes a screen of a display device to an input screen of the design work names in response to a predetermined operation, and changes the screen of the display device to an input screen of a relation between the design work names after the design work names are inputted. The design work recording means records in the recording medium the design work names inputted to the input screen of the design work names, each as one of the plural types of design work names. The inter-work relation recording means records in the recording medium a relation between the design work names inputted to the input screen of a relation between the design work names.

Further, a design process recording apparatus according to the present invention may be arranged as follows in addition to one of the above-described design process recording apparatuses. Specifically, the user interface processing means displays, on the input screen of a relation between the design work names, the design work names inputted to the input screen of the design work names and, when one of the displayed design work names is selected and inputted, displays only the design work name belonging to a type which can be related to a type of the selected design work name; the design work name is designed as selectable.

Further, a design process recording apparatus according to the present invention may be arranged as follows in addition to one of the above-described design process recording apparatuses. Specifically, the design work recording means records the design work names for each of the adaptation object names. The inter-work relation recording means records a relation between the design work names for each of the adaptation object names. The inter-work relation recording means records a relation between the concept definition or the detailed definition of a certain adaptation object name and the concept definition or the detailed definition of another adaptation object name.

Further, a design process recording apparatus according to the present invention may be arranged as follows in addition to one of the above-described design process recording apparatuses. Specifically, a user interface processing means changes a screen of the display device to an input screen of the adaptation object names in response to a predetermined operation, and after the adaptation object names are inputted, changes the screen of the display device to an input screen of the design work names related to the inputted adaptation object names, and changes the screen of the display device to a second input screen of a relation between the design work names after the design work names are inputted. The design work recording means records in the recording medium, for each of the adaptation object names, the design work names inputted to the input screen of the design work names, each as one of the plural types of design work names. The inter-work relation recording means records in the recording medium, for each of the adaptation object names, a relation between the design work names inputted to the input screen of a relation between the design work names.

Further, a design process recording apparatus according to the present invention may be arranged as follows in addition to one of the above-described design process recording apparatuses. Specifically, a searching means retrieves based on a relation between the design work names one or more design work names related to one design work name selected from the external requirement names, the concept definition names, the internal requirement names, and the detailed definition names recorded in the recording medium. A user interface processing means displays a search result by the searching means on a display device.

Further, a design process recording apparatus according to the present invention may be arranged as follows in addition to one of the above-described design process recording apparatuses. Specifically, the searching means extracts only a design work name belonging to a type selected by a user.

A data structure for recording a design process according to the present invention is generated by any one of the above-described design process recording apparatuses.

A computer program according to the present invention causes a computer to realize any one of the above-described design process recording apparatuses.

A design process recording method according to the present invention includes a design work recording step of recording in a recording medium an inputted design work name as one of plural types of design work names including external requirement names, external requirement confirmation names, concept definition names, concept definition confirmation names, internal requirement names, internal requirement confirmation names, detailed definition names, and detailed definition confirmation names, and an inter-work relation recording step of recording in the recording medium a relation between two design work names selected from one or more of the external requirement names, one or more of the concept definition names, one or more of the internal requirement names, one or more of the detailed definition names, one or more of the external requirement confirmation names, one or more of the concept definition confirmation names, one or more of the internal requirement confirmation names, and one or more of the detailed definition confirmation names recorded in the recording medium. In the inter-work relation recording step, there is recorded a relation between the external requirement name and the concept definition name, a relation between the concept definition name and the internal requirement name, a relation between the internal requirement name and the detailed definition name, a relation between the external requirement name and the internal requirement name, a relation between the external requirement name and the external requirement confirmation name, a relation between the concept definition name and the concept definition confirmation name, a relation between the internal requirement name and the internal requirement confirmation name, and a relation between the detailed definition name and the detailed definition confirmation name.

EFFECTS OF THE INVENTION

According to the present invention, it is possible to describe works such as "requirement", "definition", and "confirmation" in the narrow sense in a design process.

BRIEF DESCRIPTION OF THE DRAWINGS

FIGS. 12A and 12B are diagrams showing an example of an external requirement/concept definition matrix or the like in Embodiment 1;

FIG. 16 is a flowchart describing processing performed in Embodiment 1;

FIGS. 20A to 20C are diagrams showing a display example of search results from the search processing in Embodiment 1;

FIGS. 22A to 22F are diagrams showing examples of input screens of "adaptation object name" in Embodiment 2;

DETAILED DESCRIPTION OF THE PRESENT INVENTION

Figure 1:
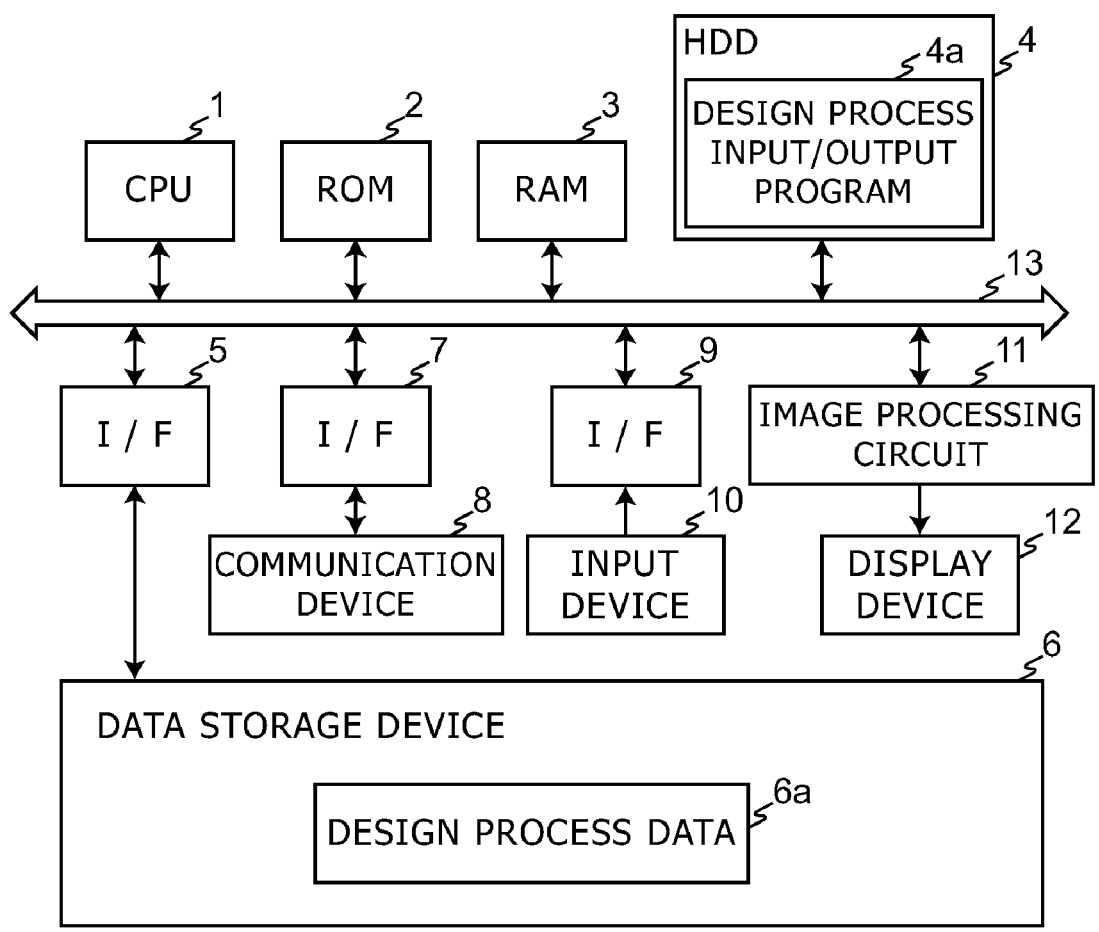
FIG. 1 is a block diagram showing a structure of a design process recording apparatus according to Embodiment 1.

Hereinafter, embodiments of the present invention will be described based on the drawings.

Meanings of Terms

First, meanings of terms used in the specification will be described.

"Adaptation object" . . . an object to which an artificial object as a product should adapt;

"Adaptation object name" . . . data indicating the adaptation object;

"External requirement" . . . a work by a designer of recognizing qualitatively or quantitatively an "influence" on a part or whole of an artificial object as a design object from an internal factor or an external environment of the artificial object, or the "influence";

"External requirement name" . . . data indicating the "external requirement";

"Concept definition" . . . a work of defining either of a structure of a part or whole of the artificial object that endures the "influence" in the "external requirement" and a structure of a part or whole of the artificial object depending on the "influence" in the "external requirement" (that is, deciding a concept of the product satisfying the "external requirement"), or a matter as a work object thereof;

"Concept definition name" . . . data indicating the "concept definition";

"Internal requirement" . . . a work of defining a characteristic that a part or whole of the artificial object should realize, or is the characteristic;

"Internal requirement name" . . . data indicating the "internal requirement";

"Detailed definition" . . . a work of defining a part or whole of the artificial object so that the characteristic defined in the "internal requirement" is realized, or a matter as a work object thereof;

"Detailed definition name" data indicating the "detailed definition";

"External requirement confirmation" . . . a work of correcting vagueness of the "influence" recognized in the "external requirement" (that is, a work of verifying the "external requirement");

"External requirement confirmation name" . . . data indicating the "external requirement confirmation";

"Internal requirement confirmation" . . . a work of verifying the certainty of a characteristic defined in the "internal requirement";

"Internal requirement confirmation name" . . . data indicating the "internal requirement confirmation";

"Detailed definition confirmation" . . . a work of verifying whether or not a part or whole of the artificial object defined in the "detailed definition" satisfies the "internal requirement";

"Detailed definition confirmation name" . . . data indicating "detailed definition confirmation;

"Design work" . . . a work in a design process, including "external requirement", "concept definition", "internal requirement", "detailed definition", "external requirement confirmation", "concept definition confirmation", "internal requirement confirmation", and "detailed definition confirmation";

"Design work name" . . . data indicating the "design work", including "external requirement name", "concept definition name", "internal requirement name", "detailed definition name", "external requirement confirmation name", "concept definition confirmation name", "internal requirement confirmation name", and "detailed definition confirmation name".

Note that regarding each "name" described above, a description of a work becomes the "name" when used for planning before performing designing of a certain kind of product, and a result of a work becomes the "name" when used as a posterior record of designing of a certain product. Therefore, they exist so as to be mingled in designing.

Embodiment 1

FIG. 1 is a block diagram showing a structure of a design process recording apparatus according to Embodiment 1 of the present invention. In FIG. 1, a CPU 1 is an arithmetic processing unit executing a program and performing processing described in the program. A ROM 2 is a non-volatile memory storing a program and data in advance. A RAM 3 is a memory which stores a program and data thereof temporarily when the program is executed. An HDD 4 is a hard disk driving device as a recording medium storing a not-shown operating system and application programs such as a design process input/output program 4a for recording and searching for design processes.

An interface 5 is an interface circuit to which a data storage device 6 can be connected. For the interface 5, an interface such as a SCSI or IDE-compatible one, IEEE1394, USB, or the like is used. The data storage device 6 is capable of storing a large amount of data, and stores design process data 6a including the "design work names" and relation data thereof. For such a device, a hard disk drive device, a disk array device, or the like is used.

An interface 7 is an interface circuit to which a communication device 8 can be connected. The communication device 8 is a network interface card, a modem, or the like. For the interface 7, an interface such as USB or RS-232C for connecting an external device is used. However, when a device that can be built into a computer such as a network interface card is used as the communication device 8, this device can be connected to a bus 13 directly.

An interface 9 is an interface circuit to which an input device 10 such as a keyboard, a mouse, and the like can be connected. For the interface 9, an interface such as PS/2, USB, or the like is used.

An image processing circuit 11 outputs, when image data is written, the image signal corresponding to this data. To this image processing circuit 11, a display device 12 displaying an image based on the image signal can be connected.

The bus 13 is a signal path connecting the CPU 1, the ROM 2, the RAM 3, the HDD 4, the interfaces 5, 7, 9, and the image processing circuit 11 with each other. Incidentally, the form of connecting the CPU 1 and so on with each other is not limited to the bus 13, and may be a form appropriately using a bus, a controller, and the like.

Incidentally, the device according to Embodiment 1 is realized by installing the operating system, the design process input/output program 4a, and so on in a computer such as a personal computer, a server apparatus, or the like.

Figure 2:
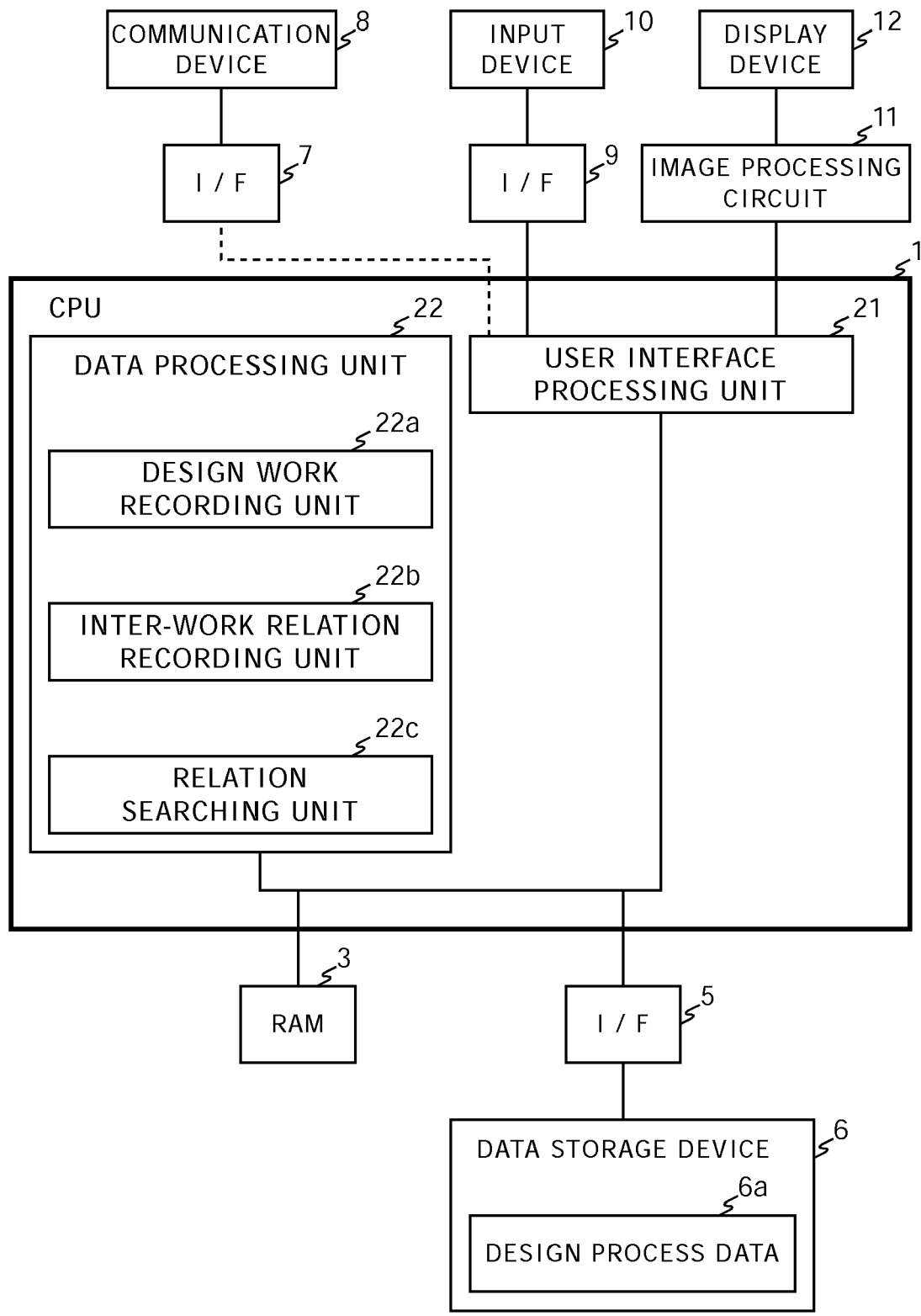
FIG. 2 is a block diagram showing a processing unit realized in Embodiment 1.

FIG. 2 is a block diagram showing a processing unit realized by the CPU 1 executing the design process input/output program 4a in Embodiment 1. The design process input/output program 4a is loaded to the RAM 3, and thereafter executed by the CPU 1. Thus, the following processing units are realized by the CPU 1.

In FIG. 2, a user interface processing unit 21 controls display of data for the user, and obtains input data based on a user's operation. Incidentally, the user's operation is performed as moving of a cursor, inputting characters at the cursor position, a click operation, and/or the like using the input device 10. The user interface processing unit 21 changes, particularly in response to a predetermined operation, the screen of the display device 12 to an input screen of "design work name" and changes the screen of the display device 12 to an input screen of a relation between "design work names" after the "design work names" are inputted. This user interface processing unit 21 functions as a user interface processing means. As the predetermined operation, data indicating a user's operation to the input device 10 is supplied to the user interface processing unit 21 from the input device 10, or data indicating a user's operation with a not-shown client device is received in the communication device 8 and supplied to the user interface processing unit 21. In addition, the user interface processing unit 21 receives/transmits various data from/to the communication device 8 and the input device 10 via the interfaces 7, 9 for displaying data, an image, or the like on the display device 12 via the image processing circuit 11, and supplies image display data to a not-shown client device via the communication device 8 for displaying data, an image, or the like.

A data processing unit 22 performs arithmetic processing according to the program 4a with respect to data obtained from the user interface processing unit 21, the RAM 3, the data storage device 6, and so on. The data processing unit 22 has a design work recording unit 22a, an inter-work relation recording unit 22b, and a relation searching unit 22c.

The design work recording unit 22a is a processing unit which records a "design work name" inputted from the communication device 8 or the input device 10 as one of "external requirement name", "external requirement confirmation name", "concept definition name", "concept definition confirmation name", "internal requirement name", "internal requirement confirmation name", "detailed definition name", and "detailed definition confirmation name" in the data storage device 6. The design work recording unit 22a functions as a design work recording means.

The inter-work relation recording unit 22b is a processing unit which records in the data storage device 6 a relation between two "design work names" selected from "external requirement name", "external requirement confirmation name", "concept definition name", "concept definition confirmation name", "internal requirement name", "internal requirement confirmation name", "detailed definition name", and "detailed definition confirmation name" recorded in the data storage device 6. The inter-work relation recording unit 22b functions as an inter-work relation recording means.

The relation searching unit 22c is a processing unit which searches for a "design work name" related to one "design work name" selected from "external requirement name", "concept definition name", "internal requirement name", and "detailed definition name" recorded in the data storage device 6 based on a relation between "design work names". The relation searching unit 22c functions as a searching means.

Incidentally, the user interface processing unit 21 and the data processing unit 22 read and write design process data 6a from/to the data storage device 6 via the interface 5.

Next, data structures of a "design work name" and a relation between "design work names" recorded in the data storage device 6 will be described. In Embodiment 1, the relation is represented by one of binary values as related (=1) and not related (=0).

Figure 3:
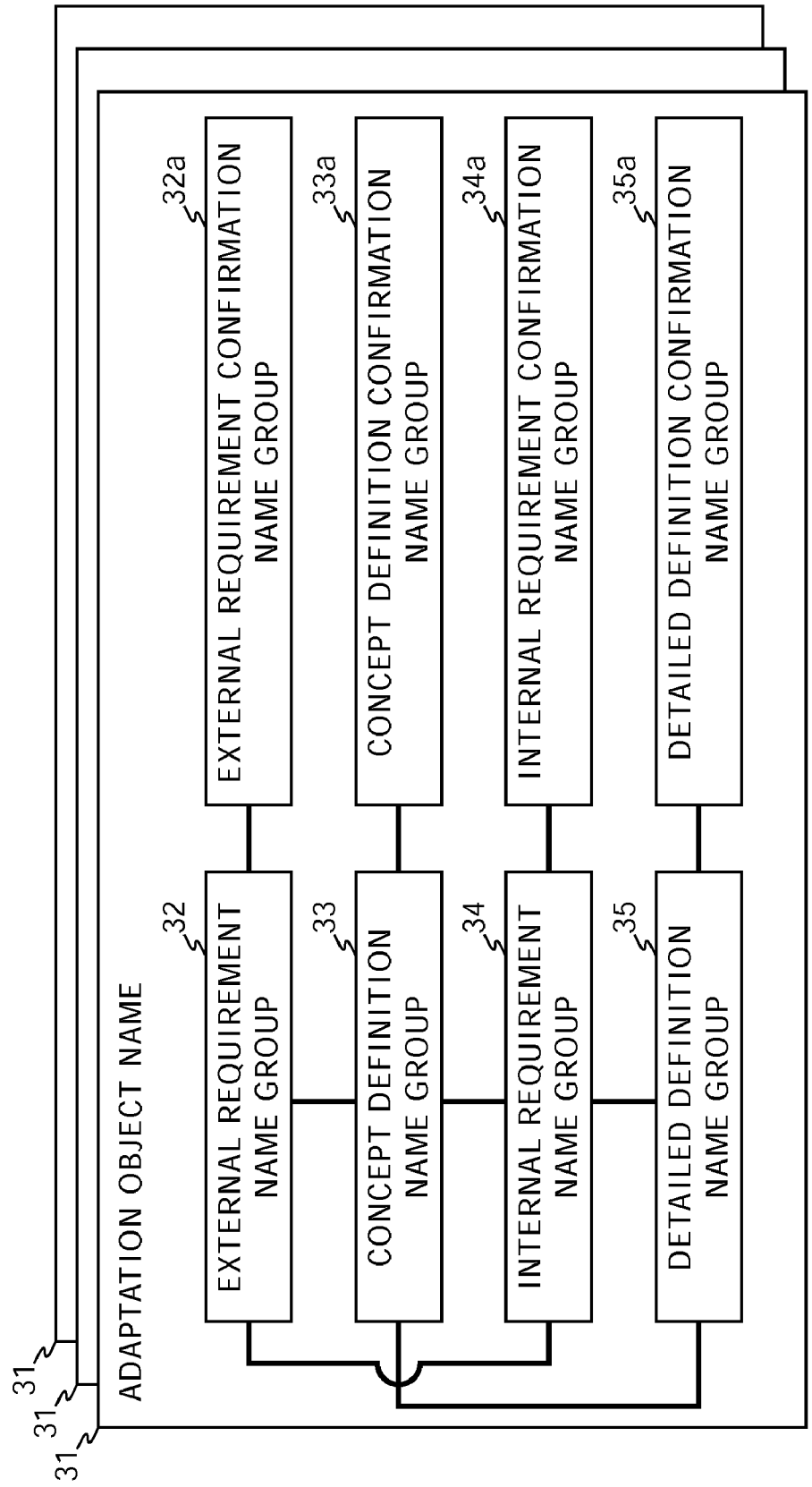
FIG. 3 is a diagram showing a logical data structure of "design work names" in Embodiment 1.

FIG. 3 is a diagram showing a logical data structure of "design work names" in Embodiment 1. In the data storage device 6, a "design work name" is stored with any of "adaptation object names" 31. That is, an aggregate of "design work names" is stored so as to be related to a certain "adaptation object name" 31. The "design work name" is stored as one of types of "external requirement name", "external requirement confirmation name", "concept definition name", "concept definition confirmation name", "internal requirement name", "internal requirement confirmation name", "detailed definition name", and "detailed definition confirmation name".

Thus, in the data storage device 6, an external requirement name group 32 including one or more "external requirement names" is stored as a table or the like. Likewise, an external requirement confirmation name group 32a including one or more "external requirement confirmation names" is stored as a table or the like. Likewise, a concept definition name group 33 including one or more "concept definition names" is stored as a table or the like. Likewise, a concept definition confirmation name group 33a including one or more "concept definition confirmation names" is stored as a table or the like Likewise, an internal requirement name group 34 including one or more "internal requirement names" is stored as a table or the like. Likewise, an internal requirement confirmation name group 34a including one or more "internal requirement confirmation names" is stored as a table or the like. Likewise, a detailed definition name group 35 including one or more "detailed definition names" is stored as a table or the like. Likewise, a detailed definition confirmation name group 35a including one or more "detailed definition confirmation names" is stored as a table or the like.

For two design work name groups among these design work name groups, relation data is stored in the data storage device 6. However, combinations of two design work name groups are limited only to:
(a) relation between all the "external requirement names" in the external requirement name group 32 and all the "concept definition names" in the concept definition name group 33;
(b) relation between all the "concept definition names" in the concept definition name group 33 and all the "internal requirement names" in the internal requirement name group 34;
(c) relation between all the "internal requirement names" in the internal requirement name group 34 and all the "detailed definition names" in the detailed definition name group 35;
(d) relation between all the "external requirement names" in the external requirement name group 32 and all the "internal requirement names" in the internal requirement name group 34;
(e) relation between all the "concept definition names" in the concept definition name group 33 and all the "detailed definition names" in the detailed definition name group 35, for all the "adaptation object names" 31;
(f) relation between all the "external requirement names" in the external requirement name group 32 and all the "external requirement confirmation names" in the external requirement confirmation name group 32a;
(g) relation between all the "concept definition names" in the concept definition name group 33 and all the "concept definition confirmation names" in the concept definition confirmation name group 33a;
(h) relation between all the "internal requirement names" in the internal requirement name group 34 and all the "internal requirement confirmation names" in the internal requirement confirmation name group 34a; and
(i) relation between all the "detailed definition names" in the detailed definition name group 35 and all the "detailed definition confirmation names" in the detailed definition confirmation name group 35a.

Accordingly, any combination of other design work name groups is prohibited. For each of these combinations, relation data is stored as one table or the like in the data storage device 6.

Figure 4:
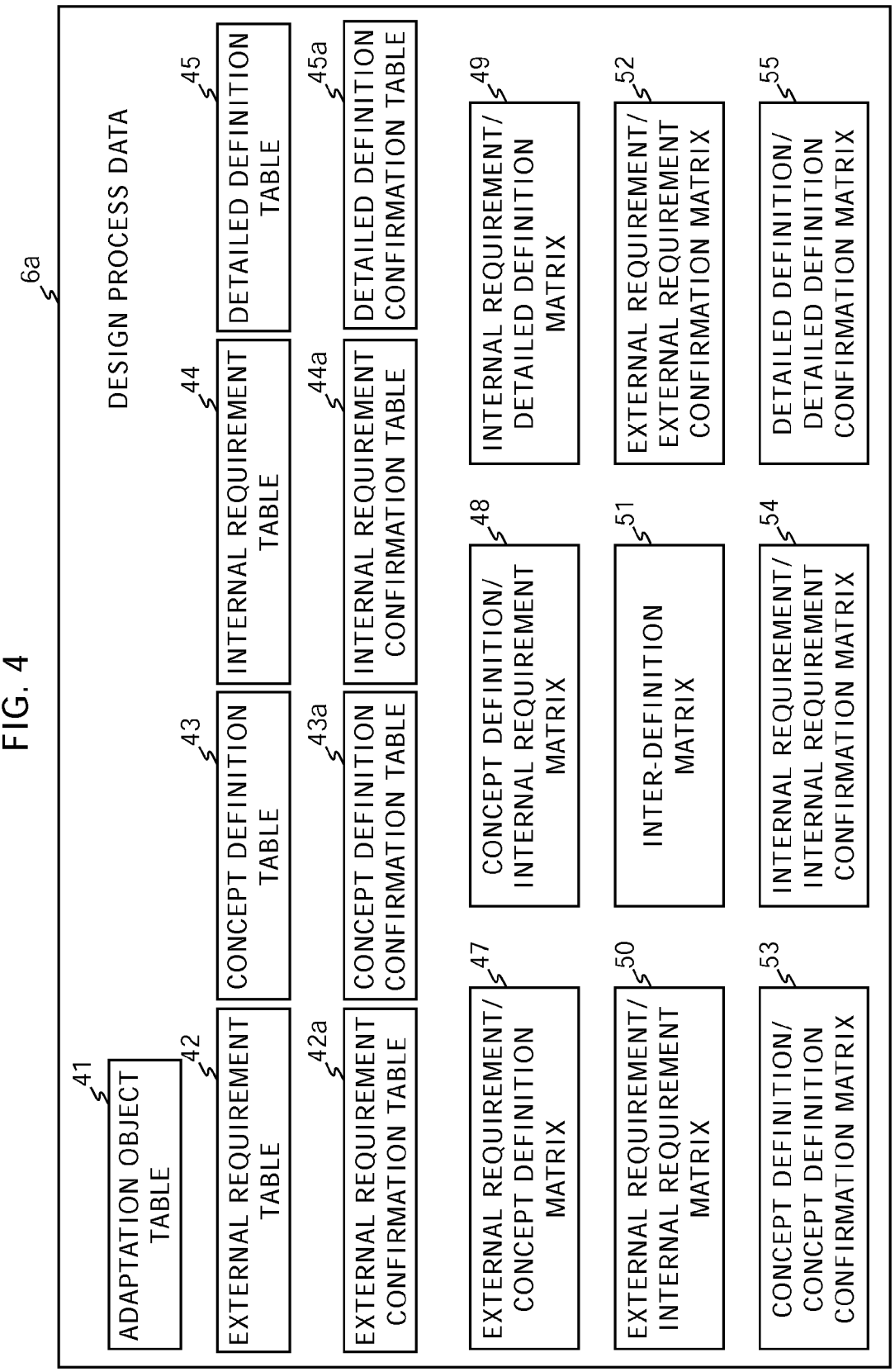
FIG. 4 is a diagram showing a structure of design process data including "design work names" and their relation data in Embodiment 1.

FIG. 4 is a diagram showing a structure of a design process data 6a including "design work names" and their relation data. As shown in FIG. 4, the design process data 6a has an adaptation object table 41 including "adaptation object names" 31. The design process data 6a also has an external requirement table 42, an external requirement confirmation table 42a, a concept definition table 43, a concept definition confirmation table 43a, an internal requirement table 44, an internal requirement confirmation table 44a, a detailed definition table 45, and a detailed definition confirmation table 45a, which include "design work names". The external requirement table 42 has the external requirement name group 32. The external requirement confirmation table 42a has an external requirement confirmation name group 32a. The concept definition table 43 has the concept definition name group 33. The concept definition confirmation table 43a has the concept definition confirmation name group 33a. The internal requirement table 44 has an internal requirement name group 34. The internal requirement confirmation table 44a has the internal requirement confirmation name group 34a. The detailed definition table 45 has the detailed definition name group 35. The detailed definition confirmation table 45a has the detailed definition confirmation name group 35a.

The design process data 6a further has an external requirement/concept definition matrix 47, a concept definition/internal requirement matrix 48, an internal requirement/detailed definition matrix 49, an external requirement internal requirement matrix 50, an inter-definition matrix 51, an external requirement/external requirement confirmation matrix 52, a concept definition/concept definition confirmation matrix 53, an internal requirement/internal requirement confirmation matrix 54, and a detailed definition/detailed definition confirmation matrix 55, which include relation data of "design work names". The external requirement/concept definition matrix 47 has relation data of all "external requirement names" and "concept definition names" for every "adaptation object name". The concept definition/internal requirement matrix 48 has relation data of all "concept definition names" and "internal requirement names" for every "adaptation object name". The internal requirement/detailed definition matrix 49 has relation data of all "internal requirement names" and "detailed definition names" for every "adaptation object name". The external requirement/internal requirement matrix 50 has relation data of all "external requirement names" and "internal requirement names" for every "adaptation object name". The inter-definition matrix 51 has relation data of all "concept definition names" and "detailed definition names" for every "adaptation object name", and has relation data of all "concept definition names" and "detailed definition names across "adaptation object names". The external requirement/external requirement confirmation matrix 52 has relation data of all "external requirement names" and "external requirement confirmation names" for every "adaptation object name". The concept definition/concept definition confirmation matrix 53 has relation data of all "concept definition names" and "concept definition confirmation name" for every "adaptation object name". The internal requirement/internal requirement confirmation matrix 54 has relation data of all "internal requirement names" and "internal requirement confirmation names" for every "adaptation object name". The detailed definition/detailed definition confirmation matrix 55 has relation data of all "detailed definition names" and "detailed definition confirmation names" for every "adaptation object name".

Each of the above tables and matrices may be stored as one data file, or a plurality of tables and matrices may be stored in combination as one data file.

Here, data structures of each table and matrix will be described.

Figure 5:
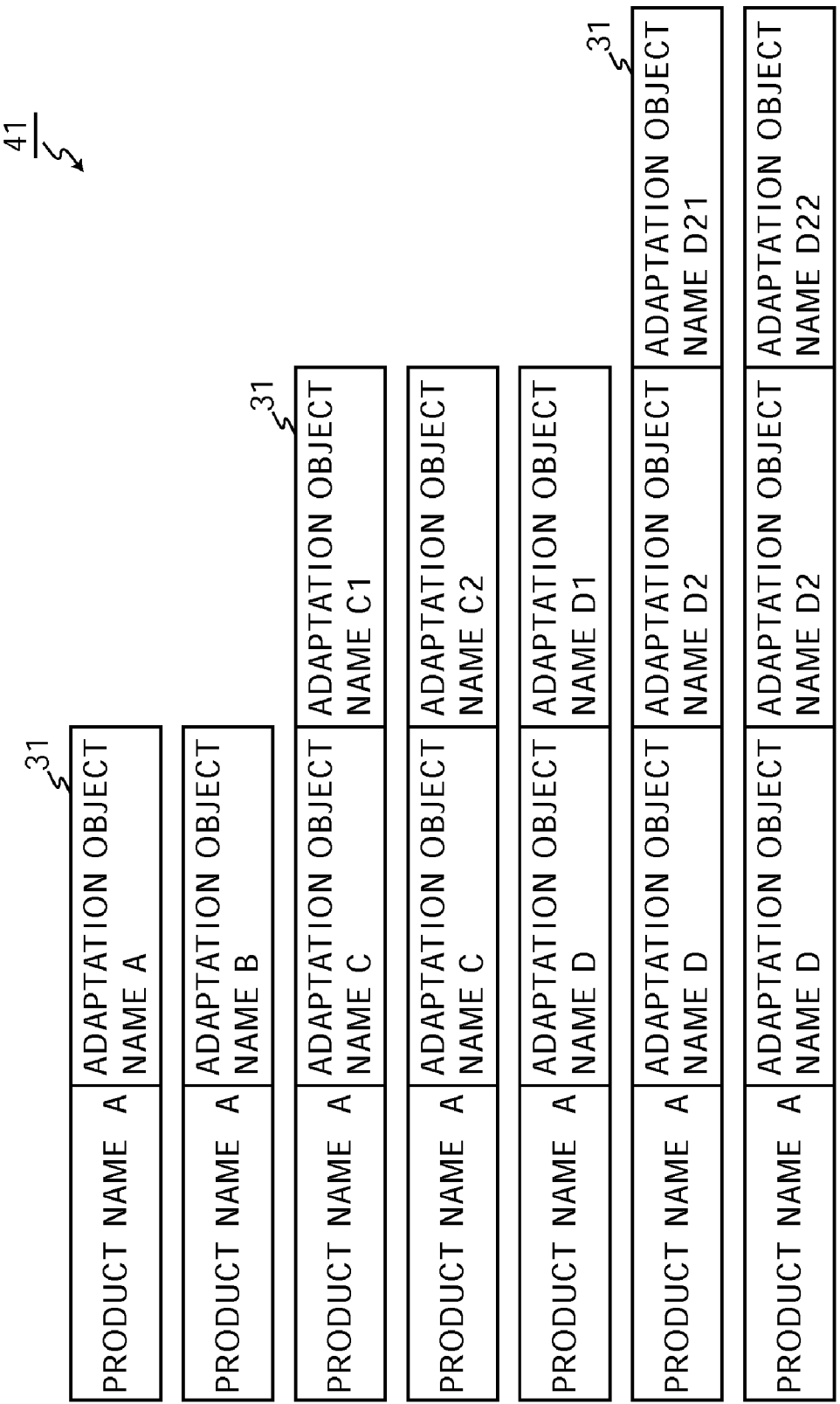
FIG. 5 is a diagram showing an example of an adaptation object table in Embodiment 1.

FIG. 5 is a diagram showing an example of the adaptation object table 41. In the adaptation object table 41, the "adaptation object names" 31 are stored so as to be related to the product name of a product as a design object. The "adaptation object names" 31 are also stored in a hierarchical structure if necessary. In FIG. 5, for example, an adaptation object name C1 is stored so as to be related as a subordinate to an adaptation object name C. In the adaptation object table 41, a product name and one or more "adaptation object names" 31 are stored in a relation of 1:N. That is, one or more "adaptation object names" 31 are stored so as to be related to one product name. Typical examples of the "adaptation object names" 31 include "user" to which the product is related (having subordinates such as "adult", "child", "Japanese", and so on), "production process" (having subordinates such as specific process names), and "laws" (having subordinates such as specific names of laws).

In the external requirement table 42, the "external requirement names" are stored. The above-described "adaptation object" becomes an opportunity to recall an objective and a condition independent from each other which the product should satisfy in the design process. For example, in a certain design process, an objective and a condition such as easiness of handling and no risks of disorder should be considered for a user. A work of recognizing these objective and constraint condition is an "external requirement" and is stored as an "external requirement name". Therefore, it is distinguished from a requirement of the product itself that requires to establish itself (="internal requirement").

Figure 6:
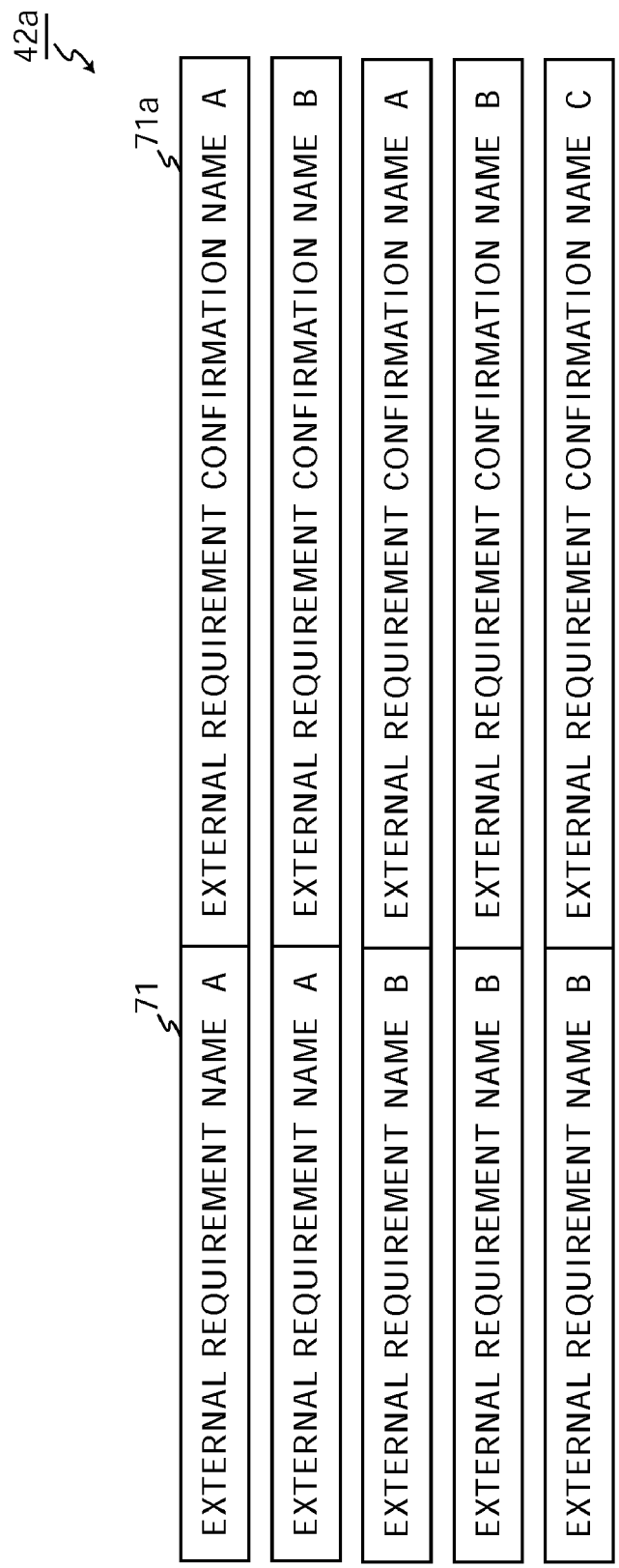
FIG. 6 is a diagram showing an example of an external requirement confirmation table in Embodiment 1.

FIG. 6 is a diagram showing an example of the external requirement confirmation table 42a. In the external requirement confirmation table 42a, "external requirement confirmation names" 71a are stored so as to be related to "external requirement names" 71. In the external requirement confirmation table 42a, the "external requirement confirmation names" 71a and the "external requirement names" 71 are stored in a relation of N:M. That is, each of one or more "external requirement names" 71 is stored so as to be related to each of one or more "external requirement confirmation names" 71a. The above-described "external requirement" may not be defined as a sufficiently clear condition during designing in an actual design process. For example, in the above-described example of an "external requirement", easiness of handling is exemplified, but during product designing, it is possible that to what degree it may be easy to handle cannot be defined adequately. To solve such unclearness of requirement, the "external requirement confirmation" such as evaluation or verification exists. This "external requirement confirmation" is stored as the "external requirement confirmation name" 71a.

Figure 7:
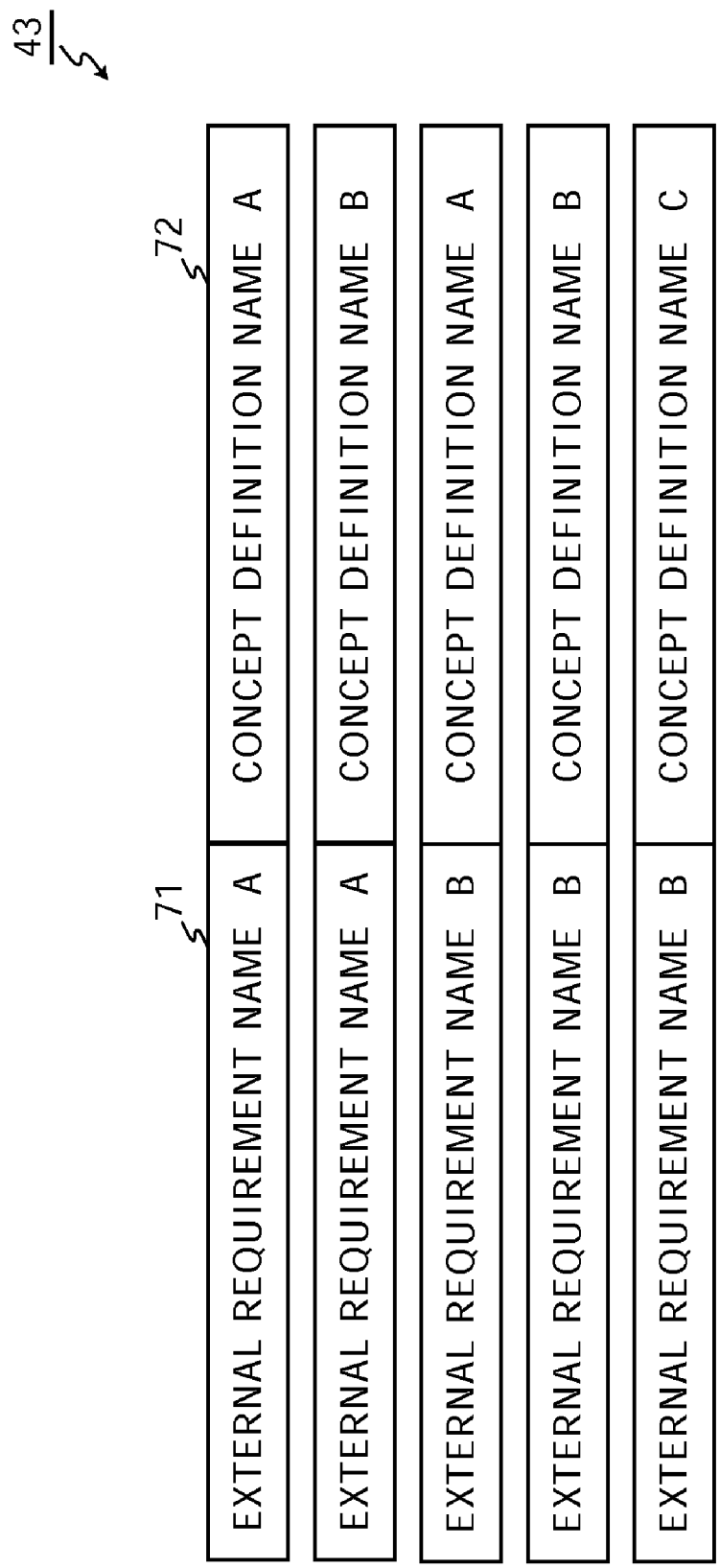
FIG. 7 is a diagram showing an example of a concept definition table in Embodiment 1.

FIG. 7 is a diagram showing an example of the concept definition table 43. In the concept definition table 43, "concept definition names" 72 are stored so as to be related to the "external requirement names" 71. In the concept definition table 43, the "concept definition names" 72 and the "external requirement names" 71 are stored in a relation of N:M. The "concept definition" is a work of defining a basic concept of a product so as to satisfy the "external requirement", and is derived from the already inputted "external requirement name" 71 and is inputted as the "concept definition name" 72 by a designer or the like.

Figure 8:
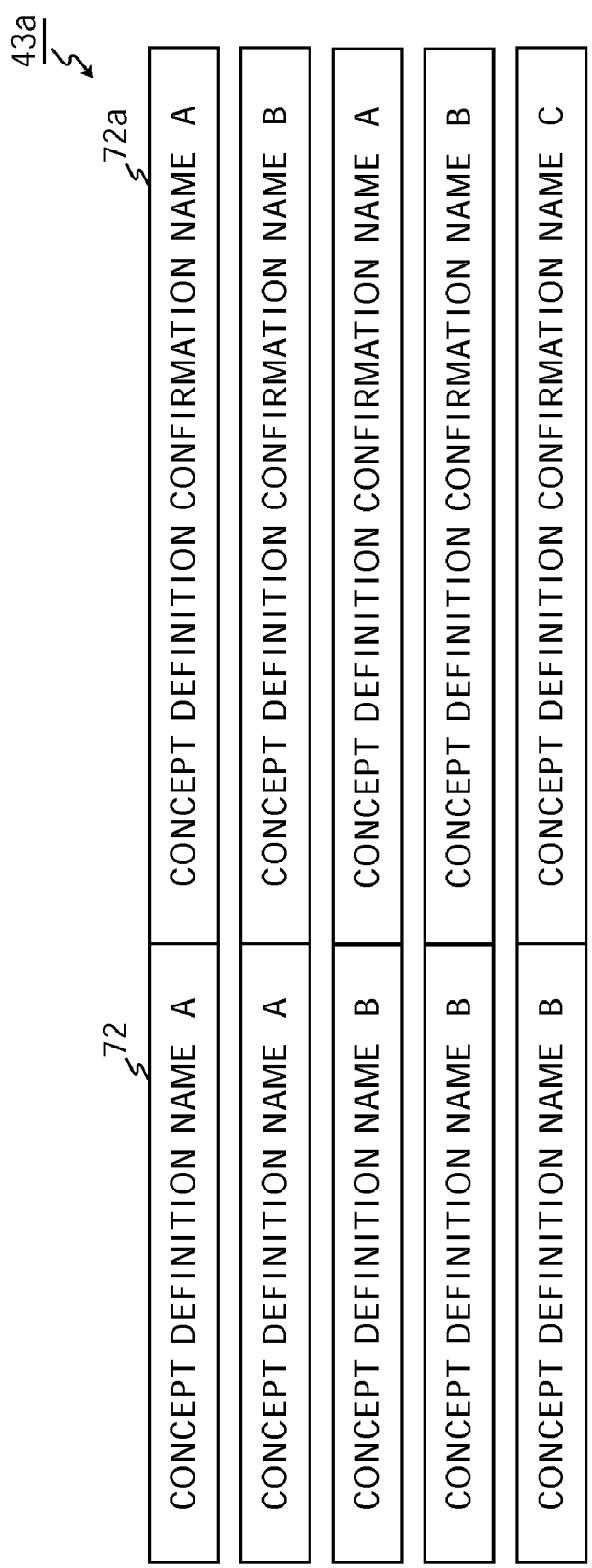
FIG. 8 is a diagram showing an example of a concept definition confirmation table in Embodiment 1.

FIG. 8 is a diagram showing an example of the concept definition confirmation table 43a. In the concept definition confirmation table 43a, "concept definition confirmation names" 72a are stored so as to be related to the "concept definition names" 72. In the concept definition confirmation table 43a, the "concept definition confirmation names" 72a and the concept definition names" 72 are stored in a relation of N:M. In ordinary designing, the "concept definition" may not be decided based on an established logic or adequately reliable data. In such cases, the "concept definition" includes an uncertainty. To eliminate such an uncertainty of definition, the "concept definition confirmation" such as evaluation and verification is planned and carried out. This "concept definition confirmation" is stored as the "concept definition confirmation name" 72a.

In the internal requirement table 44, "internal requirement names" are stored. An "internal requirement" is a work for deriving assumed target values of various characteristics which must be introduced to a product in order to adapt a design solution obtained in the "concept definition" to the "external requirement". A designer or the like derives the "internal requirement names" from an already inputted "concept definition name" 72 and an "external requirement name" 71 related thereto.

Figure 9:
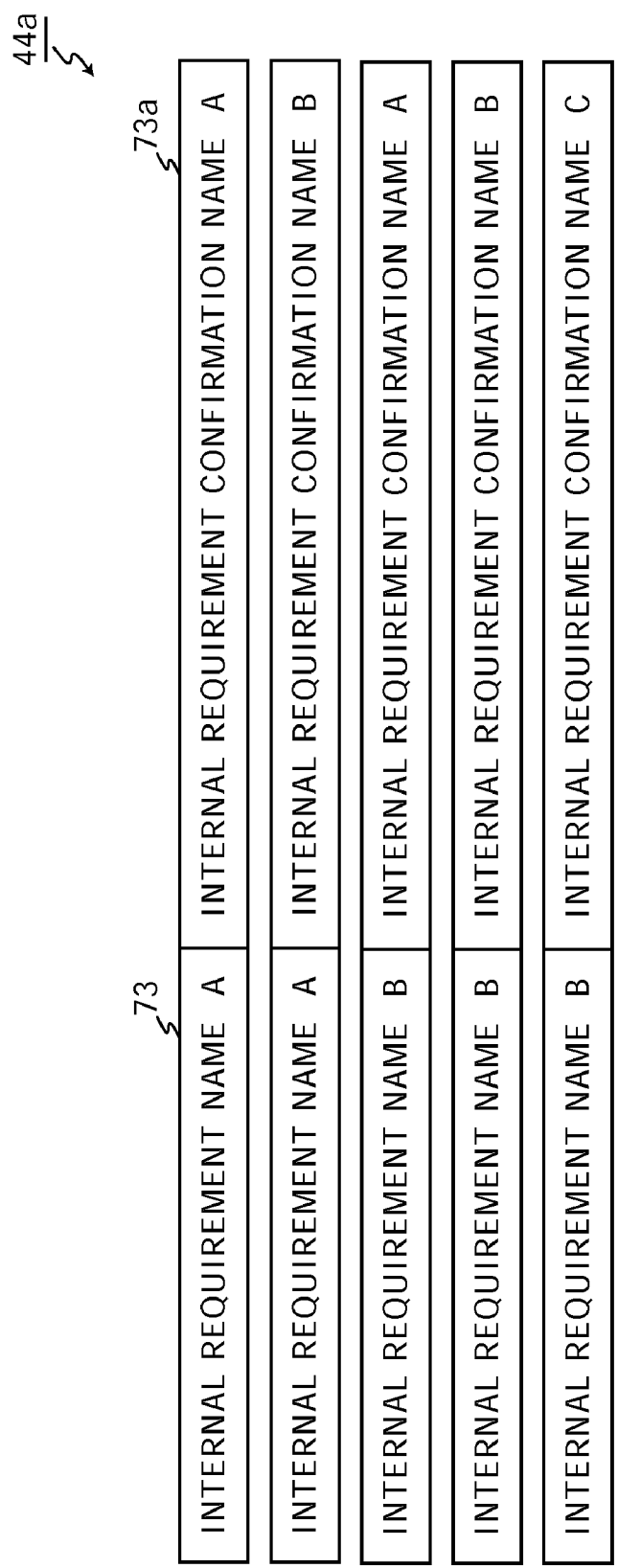
FIG. 9 is a diagram showing an example of an internal requirement confirmation table in Embodiment 1.

FIG. 9 is a diagram showing an example of the internal requirement confirmation table 44a. In the internal requirement confirmation table 44a, "internal requirement confirmation names" 73a are stored so as to be related to "internal requirement names" 73. In the internal requirement confirmation table 44a, the "internal requirement confirmation names" 73a and the "internal requirement names" 73 are stored in a relation of N:M. In an actual design process, the "internal requirement" may not be assumed properly. For the "influence" grasped by the "external requirement", which is considered to be received by a product, the "characteristic" (a qualitative or quantitative target value of performance which the product must have for adapting to the external requirement) demanded as an "internal requirement" for a product may not be set correctly. For example, there may be a case where it is not possible to clearly set the degree of product strength as a target value against vibration received by a product in use when sufficient proofs with a theory and data do not exist. To eliminate such an uncertainty of "internal requirement", there exists an "internal requirement confirmation" such as evaluation and verification. This "internal requirement confirmation" is stored as the "internal requirement confirmation name" 73*a*.

Figure 10:
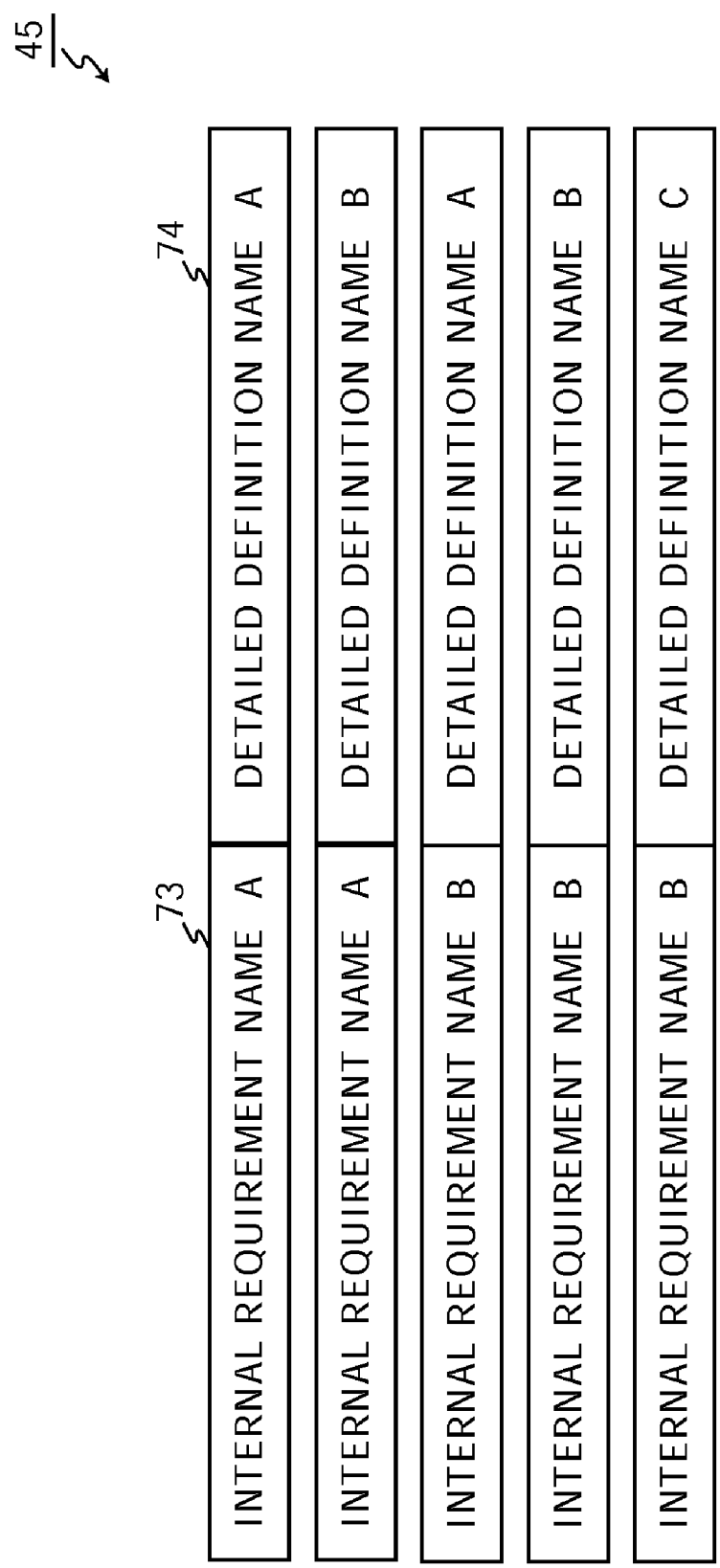
FIG. 10 is a diagram showing an example of a detailed definition table in Embodiment 1.

FIG. 10 is a diagram showing an example of the detailed definition table 45. In the detailed definition table 45, the "detailed definition names" 74 are stored so as to be related to the "internal requirement names" 73. In the detailed definition table 45, the "detailed definition names" 74 and the "internal requirement names" 73 are stored in a relation of N:M.

Figure 11:
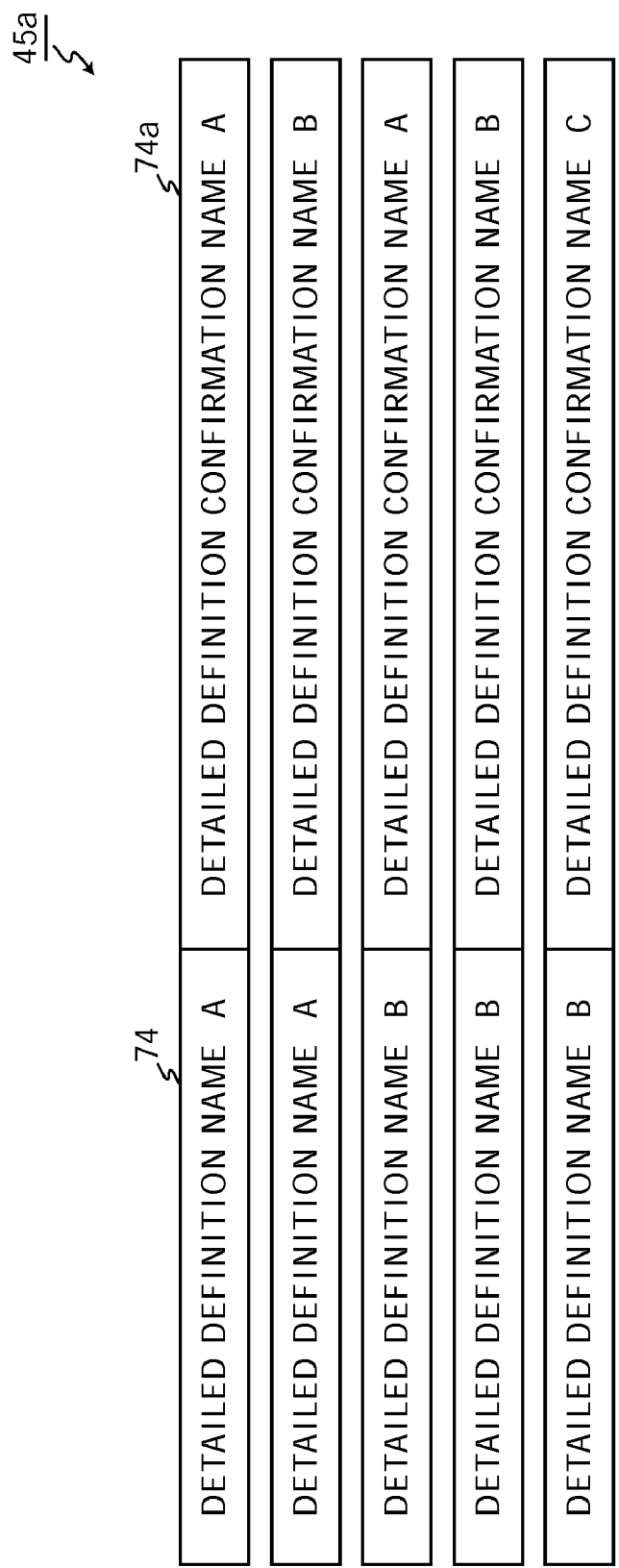
FIG. 11 is a diagram showing an example of a detailed definition confirmation table in Embodiment 1.

FIG. 11 is a diagram showing an example of the detailed definition confirmation table 45*a*. In the detailed definition confirmation table 45*a*, "detailed definition confirmation names" 74*a* are stored so as to be related to "detailed definition names" 74. In the detailed definition confirmation table 45*a*, the "detailed definition confirmation names" 74*a* and the "detailed definition names" 74 are stored in a relation of N:M. In a design process, the "detailed definition" may not be decided based on an established theory or highly reliable data. To eliminate such an uncertainty of "detailed definition", there exists a "detailed definition confirmation" such as evaluation and verification. This "detailed definition confirmation" is stored as the "detailed definition confirmation name" 74*a*.

FIGS. 12A and 12B are diagrams showing an example of the external requirement/concept definition matrix 47 or the like. As shown in FIG. 12A, the external requirement/concept definition matrix 47 uses "external requirement names" 71 and "concept definition names" 72 as dimensions to show a relation between a certain "external requirement name" 71 and a certain "concept definition name" 72 by values of respective elements. In Embodiment 1, the value of element is 1 when there is a relation, and the value of element is 0 (zero) when there is no relation.

Incidentally, this matrix 47 may be a table shown in FIG. 12B. In the table of FIG. 12B, "external requirement names" 71 and "concept definition names" 72 having a relation to each other are stored so as to be related. Further, when there is no related "concept definition name" 72, an "external requirement name" 71 and NULL data are stored so as to be related. When there is no related "external requirement name" 71, a "concept definition name" 72 and NULL data are stored so as to be related.

The other matrices 48 to 55 use, similarly to the external requirement/concept definition matrix 47, two "design work names" as dimensions to show a relation between one "design work name" and the other "design work name" by values of respective elements. The matrices 48 to 55 may also be a table as shown in FIG. 12B.

Figure 13:
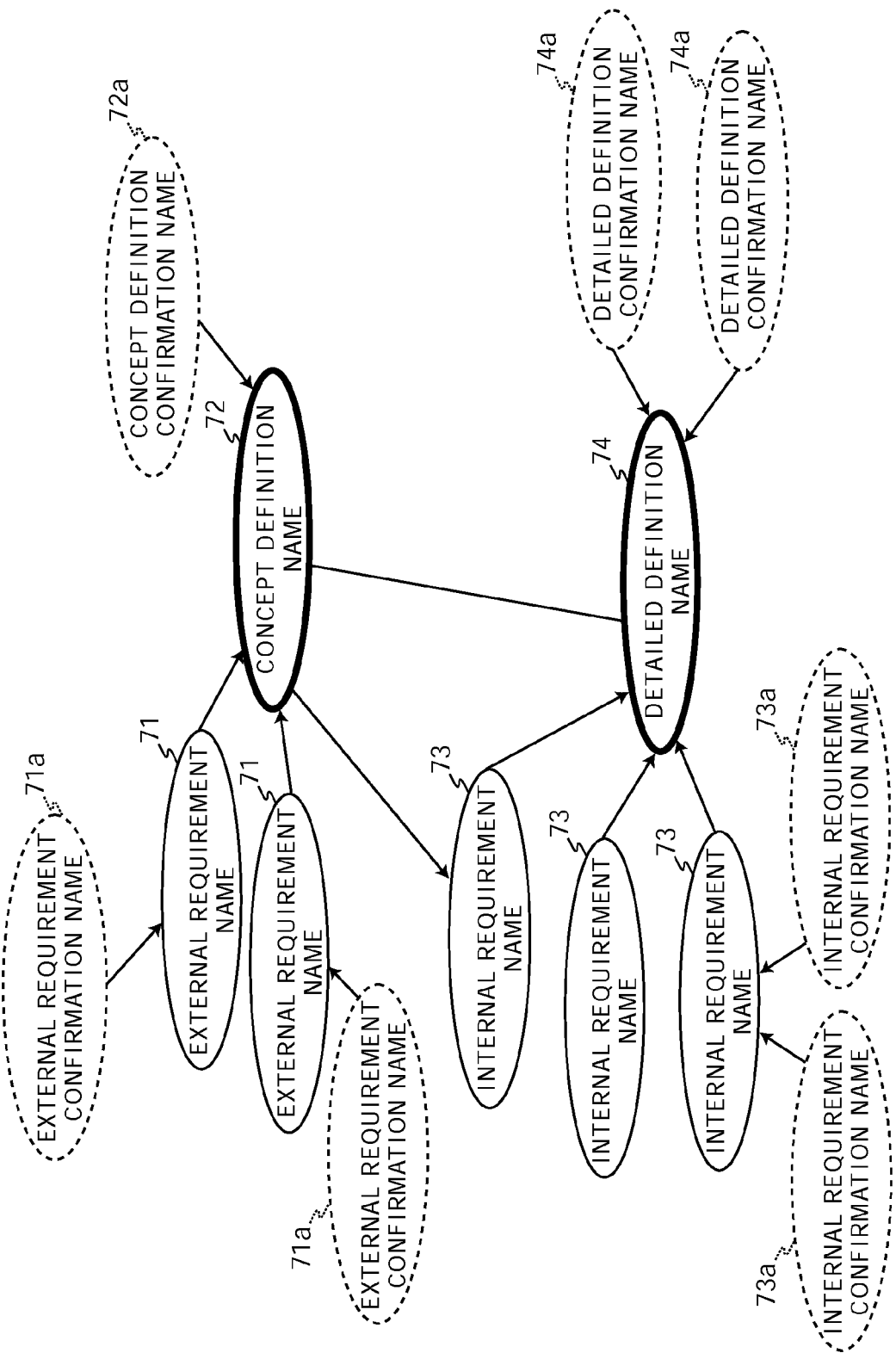
FIG. 13 is a diagram showing an example of a network of "design work names" related to a certain "adaptation object name" in Embodiment 1.
Figure 14:
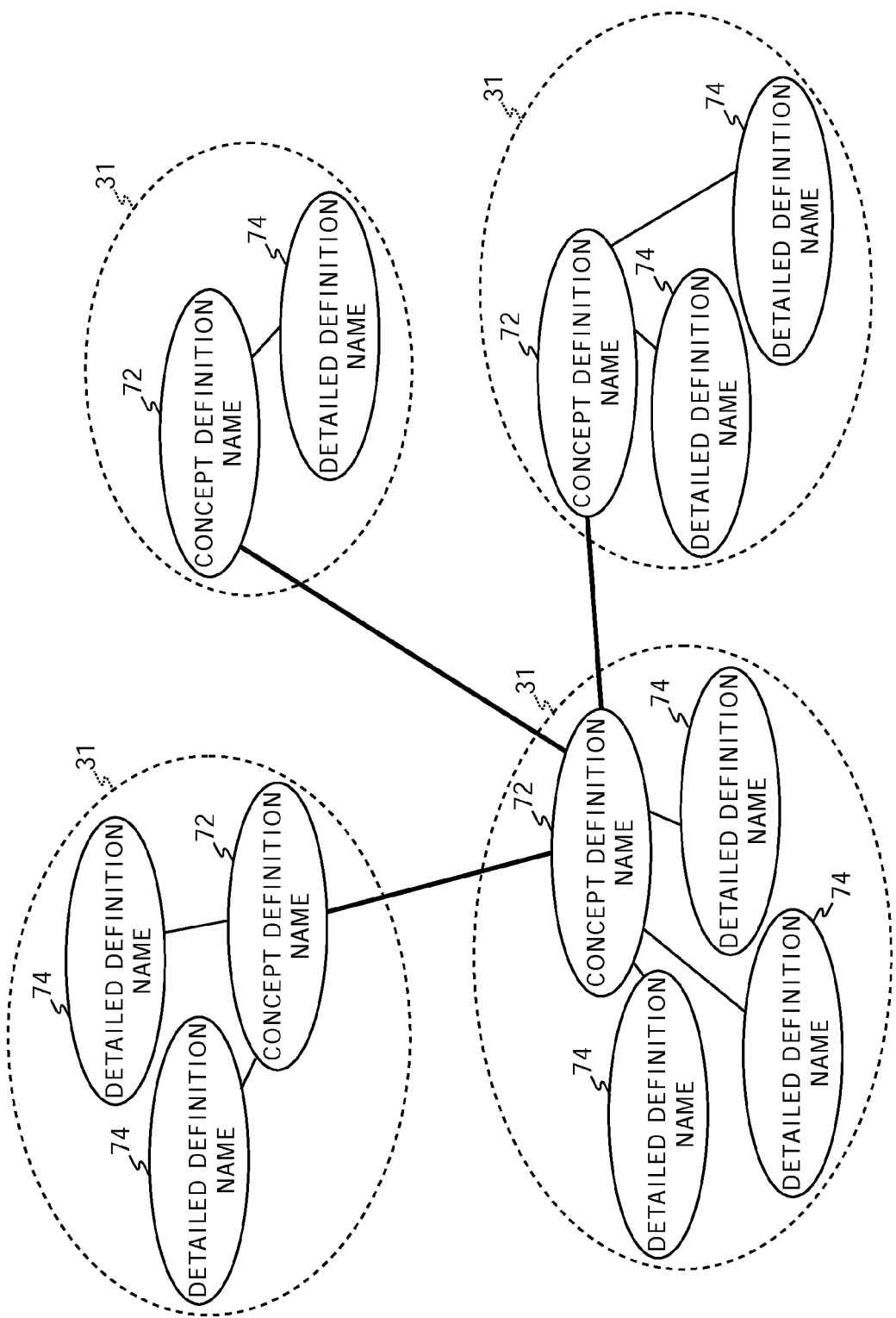
FIG. 14 is a diagram showing an example of a network of "concept definition names" across "adaptation object names" in Embodiment 1.

A network of "design work names" is constructed by such relation data of "design work names". FIG. 13 is a diagram showing an example of a network of "design work names" related to a certain "adaptation object name" 31. FIG. 14 is a diagram showing an example of a network of "concept definition names" across "adaptation object names" 31. Thus, by constructing a network of "design work names" in certain product development, it becomes possible to record a design process by a designer as data.

Figure 15:
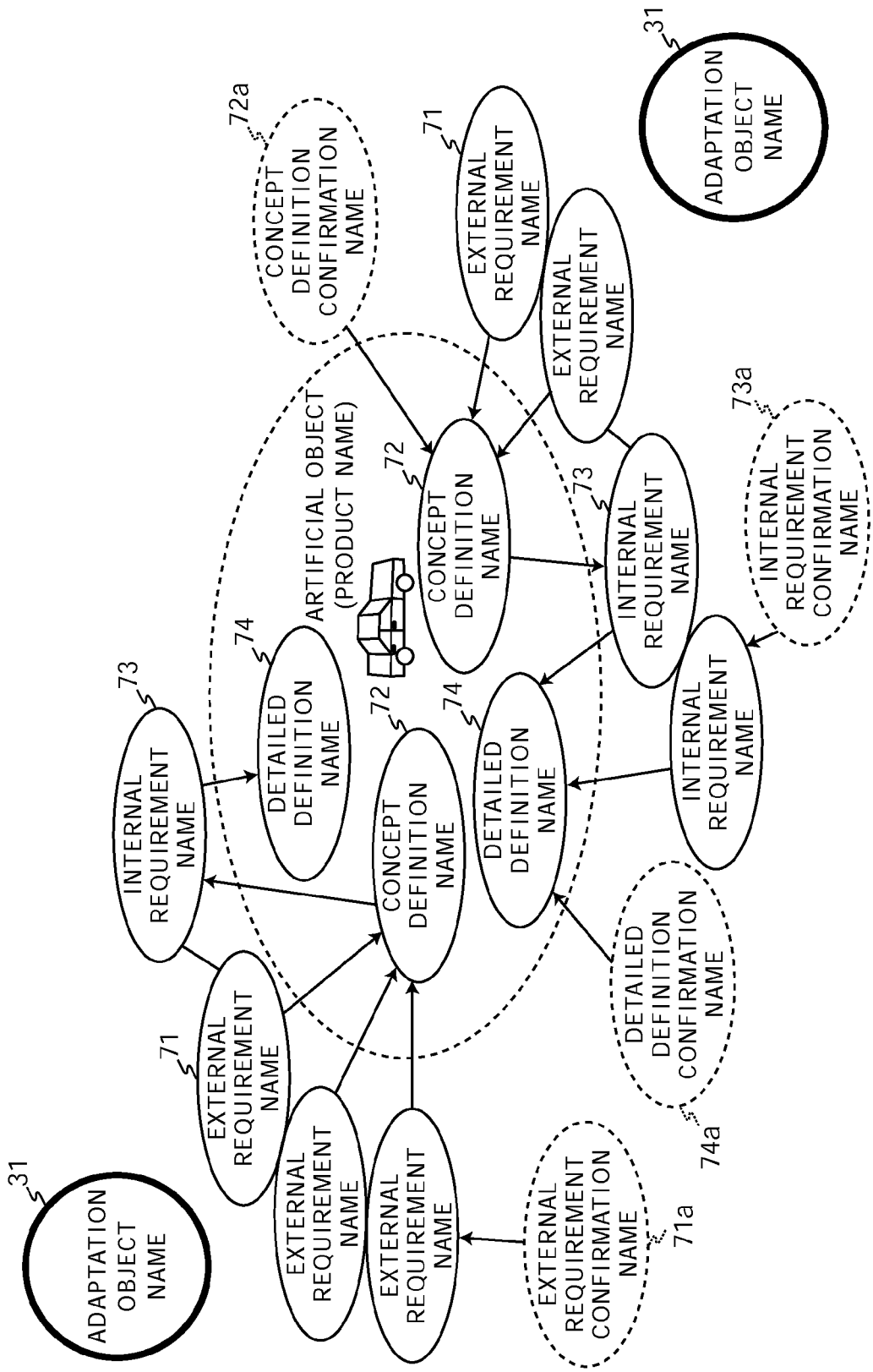
FIG. 15 is a diagram showing an example of a network of "design work names" recording design processes of an artificial object as a product in Embodiment 1.

As above, with the data structure according to Embodiment 1, it is possible to provide a framework that allows to record thinking processes of a designer in design processes. That is, the contents of thinking works by a designer are stored as "design work names", and moreover, a relation of the contents of thinking works are stored as relation data of the "design work names". FIG. 15 is a diagram showing an example of a network of "design work names" recording design processes of an artificial object as a product. Once an artificial object as a design object and an "adaptation object" therefor are identified, the designer performs designing so as to match the "adaptation object" along a series of flows. This series of design processes is recorded, as shown in FIG. 15, through paths of "external requirement", "concept definition", "internal requirement", to "detailed definition", and thus it is possible to reveal and record an item which a designer judges unconsciously. In FIG. 15, when the artificial object as a product is, for example, an automobile, "adaptation objects" 31 include "manufacturing process", "environmental issue", "end user", "maintenance service", "supplier" who supplies parts, and so on. Then, in view of each "adaptation object", the "external requirement", the "concept definition", the "internal requirement", the "detailed definition", and so on are thought by the designer, and are inputted and stored as "design work names".

Then such design processes by the designer are recorded in the above-described apparatus. Next, the operation of the above-described apparatus will be described.

First, the design process input/output program 4*a* is loaded to the RAM 3 and is executed by the CPU 1. This realizes the user interface processing unit 21 and the data processing unit 22 shown in FIG. 2. Then the user interface processing unit 21 and the data processing unit 22 perform recording processing and search processing as described in FIG. 16. In the recording processing, input processing and recording processing of "adaptation object names" 31 and "design work names" are performed (step S1), and thereafter input processing and recording processing of a relation between the "design work names" are performed (step S2). Thus, design process data 6*a* as described above is constructed. In the search processing, when a certain "design work name" is selected from the design process data 6*a* as described above, a "design work name" related to this "design work name" is retrieved, and the selected "design work name" and the "design work name" related thereto are displayed on the display device 12 (step S3).

Hereinafter, details of (1) name input processing (step S1), details of (2) relation input processing (step S2), and details of (3) search processing (step S3) will be described.

(1) Name Input Processing

Figure 17:
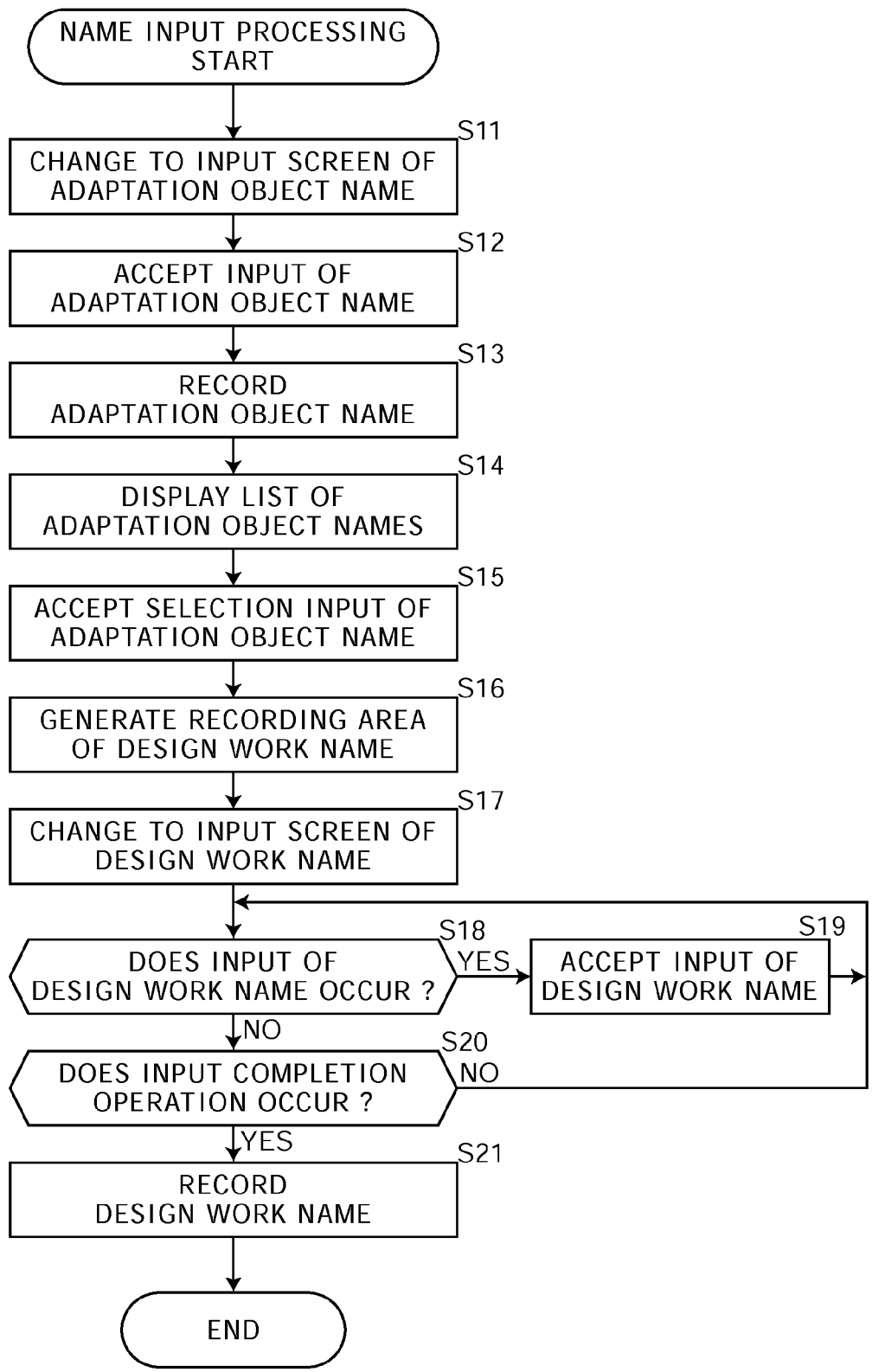
FIG. 17 is a flowchart describing details of name input processing in Embodiment 1.

FIG. 17 is a flowchart describing details of the name input processing.

Upon a predetermined operation, the user interface processing unit 21 changes the display screen of the display device 12 to an input screen of "adaptation object name" 31 (step S11). In the input screen of "adaptation object name" 31, are displayed an input field of product name and an input field of "adaptation object name" 31. For the "adaptation object name" 31, a series of input fields is displayed so as to allow to input hierarchically. Upon an input to one of the input fields based on an operation of the input device 10 by the user, the user interface processing unit 21 obtains input data thereof and stores the input data as the "adaptation object name" 31 or the product name once in the RAM 3 corresponding to the input field to which the input data is inputted (step S12). Upon finishing the input, the design work recording unit 22*a* reads the inputted "adaptation object name" 31 and product name from the RAM 3 and stores them in the data storage device 6 as the adaptation object table 41 in the design process data 6*a* (step S13).

Upon finishing recording of the "adaptation object name" 31, the user interface processing unit 21 reads the "adaptation object name" 31 from the RAM 3, and displays a list of "adaptation object names" 31 in the display device 12 (step S14). Upon an operation to the input device 10 of selecting one "adaptation object name" 31 from the list, the user interface processing unit 21 identifies the selected "adaptation object name" 31 based on input data from the input device 10 (step S15). Upon identifying the "adaptation object name" 31, the design work recording unit 22*a* allocates a recording area in the data storage device 6 for a "design work name" (such as "external requirement name" 71) related to this "adaptation object name" 31 (step S16).

The user interface processing unit 21 changes the display screen of the display device 12 to an input screen of the "design work name" related to the selected "adaptation object name" 31 (step S17). In the input screen of the "design work name", input fields are generated corresponding to types of "design work name" for every "adaptation object name" 31 inputted.

Upon an input to one of the input fields based on an operation of the input device 10 by the user (step S18), the user interface processing unit 21 obtains this input data and stores the input data as one of "external requirement names" 71, "external requirement confirmation name" 71*a*, "concept definition name" 72, "concept definition confirmation name" 72*a*, "internal requirement name" 73, "internal requirement confirmation name" 73*a*, "detailed definition name" 74, and "detailed definition confirmation name" 74*a* once in the RAM 3 corresponding to the input field to which the input data is inputted (step S19).

Until an input completion operation occurs, input processing of the "design work name" (steps S18, S19) is performed repeatedly.

In this input, with reference to the already inputted "adaptation object name" 31, the user such as a designer derives an "external requirement" associated therefrom, and inputs it in the input field as an "external requirement name" 71. Next, by the designer or the like, a "concept definition name" 72 is derived from the already inputted "external requirement name" 71 and is inputted. Then, by the designer or the like, an "internal requirement name" 73 is derived from the already inputted "concept definition name" 72 and the "external requirement name" 71 related thereto and is inputted. Furthermore, by the designer or the like, a "detailed definition name" 74 is derived from the "internal requirement name" 73 and inputted. Respective confirmation names are derived for these "design work names" and inputted.

Upon an input completion operation (step S20), the design work recording unit 22*a* reads the inputted "design work name" ("external requirement name" 71 or the like) from the RAM 3, and stores it in the data storage device 6 appropriately as the external requirement table 42, the external requirement confirmation table 42*a*, the concept definition table 43, the concept definition confirmation table 43*a*, the internal requirement table 44, the internal requirement confirmation table 44*a*, the detailed definition table 45, and the detailed definition confirmation table 45*a*, corresponding to the type of the "design work name" (step S21).

Thus, "adaptation object names" 31 and "design work names" are recorded by the name input processing. In this processing, inputs are performed in order of "adaptation object name" 31 and "design work name", and thus the inputs can be performed while shifting from a wide point of view, that is, a product and "adaptation objects" to a narrow point of view, that is, each of design works.

(2) Relation Input Processing

Figure 18:
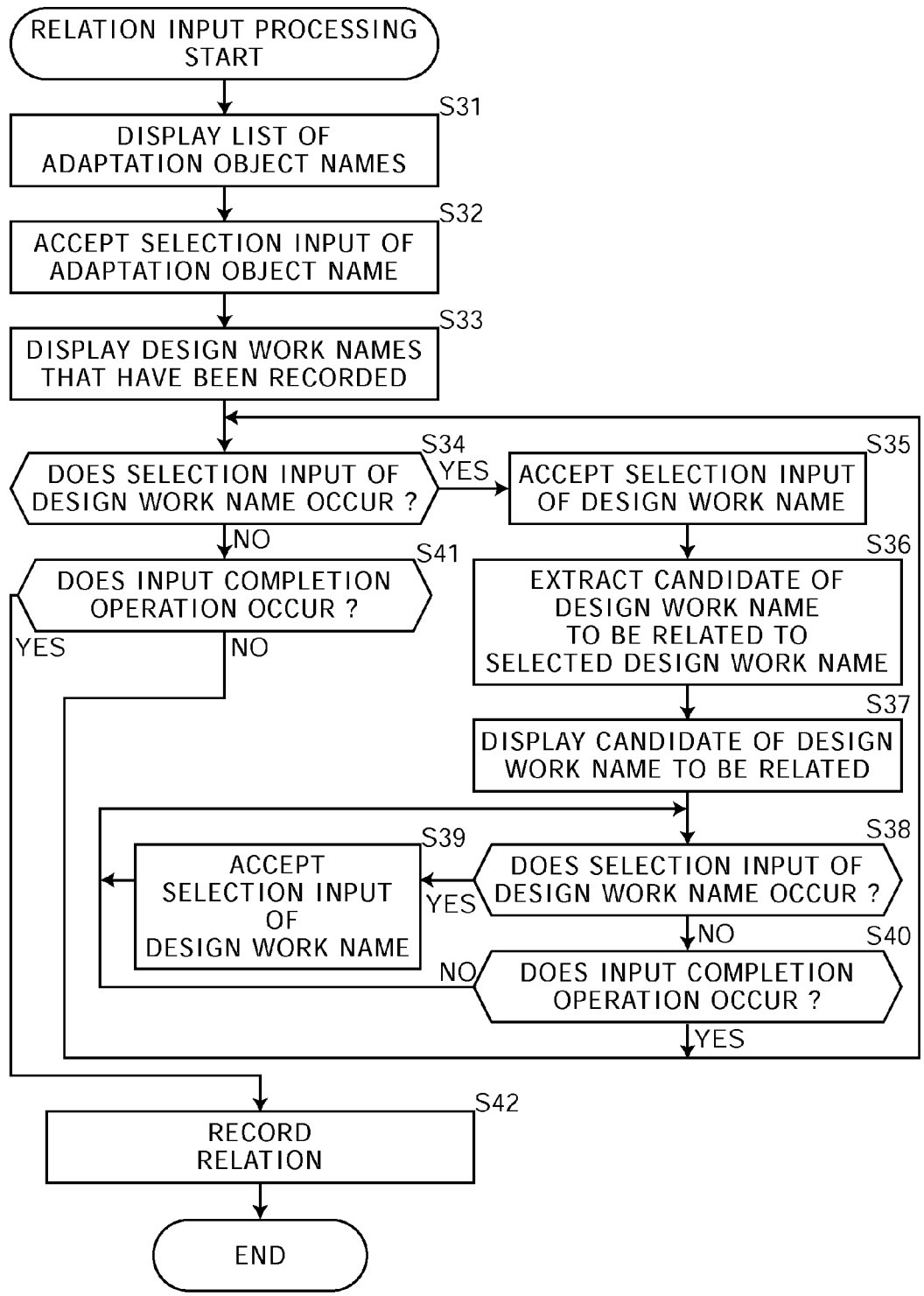
FIG. 18 is a flowchart describing details of relation input processing in Embodiment 1.

FIG. 18 is a flowchart describing details of relation input processing.

Upon finishing the name input processing, the user interface processing unit 21 reads "adaptation object names" 31 from the data storage device 6, and displays a list of the "adaptation object names" 31 on the display device 12 (step S31). When an operation of the input device 10 to select one of the "adaptation object names" 31 in the list occurs, the user interface processing unit 21 identifies the selected "adaptation object name" 31 based on input data from the input device 10 (step S32).

Upon identifying the "adaptation object name" 31, the user interface processing unit 21 refers to the tables 42 to 34, 42*a* to 45*a* to read a "design work name" related to this "adaptation object name" 31 from the data storage device 6, stores it once in the RAM 3, and displays a list of "design work names" for every type of the "design work names" on the display device 12 (step S33). When an operation of the input device 10 to select one of the "design work names" in the list occurs (step S34), the user interface processing unit 21 identifies the selected "design work name" based on input data from the input device 10 (step S35).

Upon selecting one of the "design work names", the user interface processing unit 21 extracts a "design work name" that can be related to this "design work name" out of the "design work names" stored in the RAM 3, as a candidate of "design work name" to be related (step S36), and displays it on the display device 12 (step S37). At this time, the user interface processing unit 21 extracts a "design work name" belonging to the type of "design work name" that can be related to the type of the selected "design work name" as a candidate, out of the "design work names" stored in the RAM 3. That is, only a "design work name" belonging to the type connected directly in FIG. 2 is extracted. For example, if the selected "design work name" for a certain "adaptation object name" 31 is one of the "external requirement names" 71, then all the "external requirement confirmation names" 71*a*, all the "concept definition names" 72, and all the "internal requirement names" 73 in this "adaptation object name" 31 are extracted.

Incidentally, if the selected "design work name" is a "concept definition name", then the user interface processing unit 21 refers to the concept definition tables 43 of all the "adaptation object names" 31, extracts all the "concept definition names" belonging to an "adaptation object name" 31 that is different from the "adaptation object name" 31 to which this "concept definition name" belongs, and displays them separately as a list.

When an operation is performed on the input device 10 to select one "design work name" which is decided to be related by the user (step S38), the user interface processing unit 21 identifies the selected "design work name" based on input data from the input device 10 (step S39), generates data indicating a relation of the "design work name" selected earlier to the "design work name" selected later (that is, data with a value of 1 indicating that there is a relation between them), and stores it in the RAM 3.

Until an input completion operation occurs, the input processing of relation between the "design work names" (steps S38, S39) is performed repeatedly. When the input completion operation occurs (step S40), the selection input processing of the related "design work name" is completed for the "design work name" selected earlier.

Next, it is possible to similarly perform processing of inputting a first "design work name" and then inputting a "design work name" related thereto (steps S34 to S40).

Upon an operation that means completion of all the inputs (step S41), the inter-work relation recording unit 22*b* reads relation data between inputted "design work names" from the RAM 3, and stores the data appropriately in the data storage device 6 as the external requirement/concept definition matrix 47, the concept definition/internal requirement matrix 48, the internal requirement/detailed definition matrix 49, the external requirement internal requirement matrix 50, the inter-definition matrix 51, the external requirement/external requirement confirmation matrix 52, the concept definition/concept definition confirmation matrix 53, the internal requirement/internal requirement confirmation matrix 54, and the detailed definition/detailed definition confirmation matrix 55 (step S42).

Thus, a relation between "design work names" is recorded by the relation input processing. Accordingly, regarding the "design work names", all the "design work names" are inputted regardless of the order of thinking in one screen in the name input processing, and thereafter, their relations are inputted in the relation input processing. Thus, design processes can be inputted and described without problems even when "trial and error" or the like is repeated.

(3) Search Processing

Search processing is performed as necessary after the above-described recording processing is completed and data in the design process is recorded. Therefore, a user of the search processing may be different from a user of the above-described recording processing.

Figure 19:
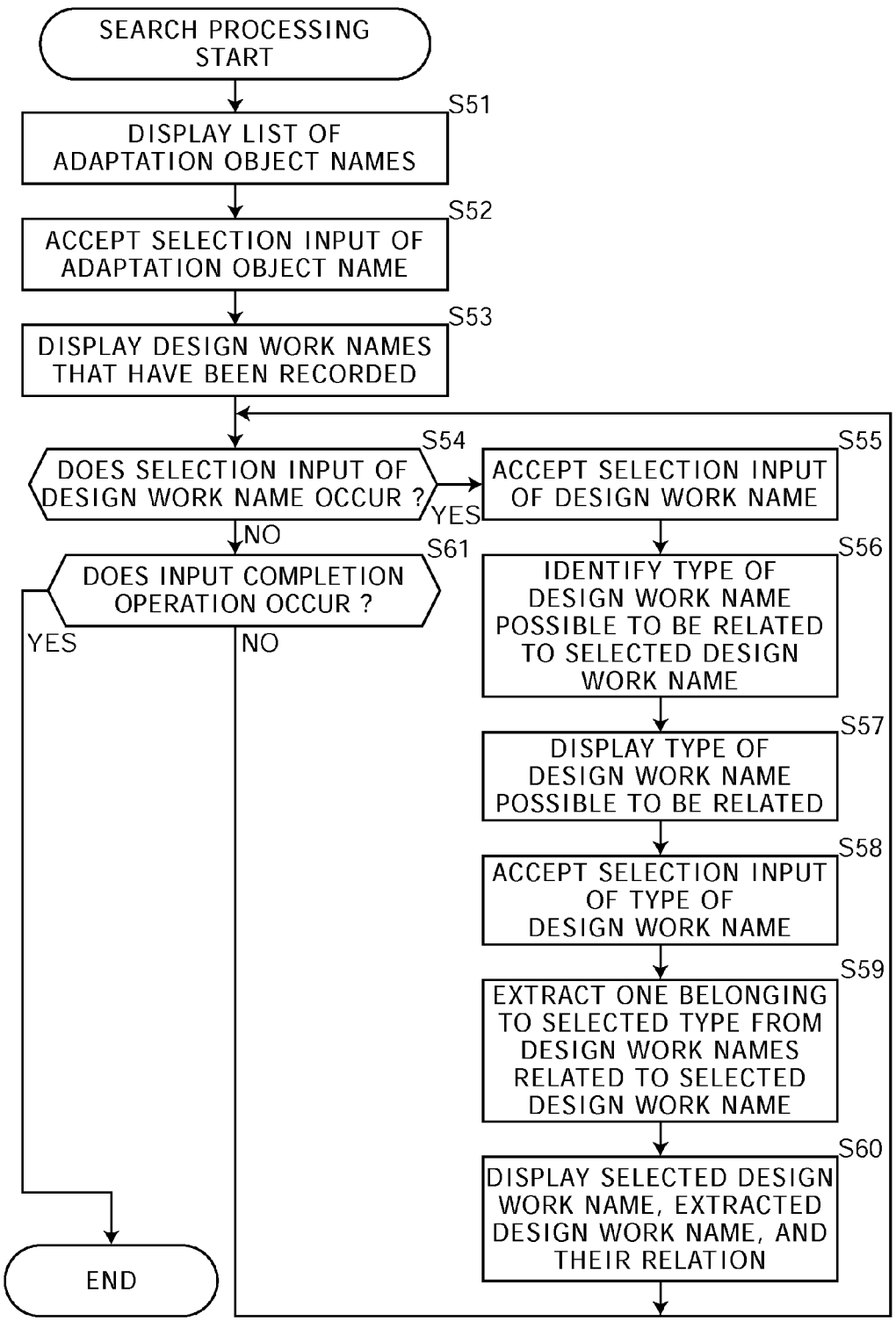
FIG. 19 is a flowchart describing details of search processing in Embodiment 1.

FIG. 19 is a flowchart describing details of the search processing.

Upon a predetermined operation, the user interface processing unit 21 reads "adaptation object names" 31 from the data storage device 6, and displays a list of the "adaptation object names" 31 on the display device 12 (step S51). When an operation on the input device 10 to select one of the "adaptation object names" 31 in the list occurs, the user interface processing unit 21 identifies the selected "adaptation object name" 31 based on input data from the input device 10 (step S52).

Upon identifying the "adaptation object name" 31, the user interface processing unit 21 reads a "design work name" related to this "adaptation object name" 31 from the data storage device 6, stores it once in the RAM 3, and displays a list of "design work names" for every type of "design work names" on the display device 12 (step S53). When an operation of the input device 10 to select one of the "design work names" in the list occurs (step S54), the user interface processing unit 21 identifies the selected "design work name" based on input data from the input device 10 (step S55).

The user interface processing unit 21 identifies the type of "design work name" having a possibility to be related to the selected "design work name" (step S56), and displays the type on the display device 12 (step S57). For example, if the selected "design work name" is an "internal requirement name" 73, then "concept requirement name", "detailed definition name", "external requirement name", and "internal requirement confirmation name" are identified as types of "design work name" having a possibility to be related.

After a list of the types of "design work names" having a possibility to be related is displayed, an operation to select one or more types desired to be retrieved by the user is performed on the input device 10. The user interface processing unit 21 obtains input data of this operation from the input device 10, and identifies the type of the selected "design work name" based on the input data (step S58).

Then, the relation searching unit 22c extracts only ones belonging to the selected type of "design work name" from the "design work names" related to the "design work name" selected earlier (step S59). At this time, the relation searching unit 22c refers to matrices (one or more of the matrices 47 to 55) having relation data of the type to which the "design work name" selected earlier belongs and the type of the "design work name" selected later, and extracts a "design work name" related to the "design work name" selected earlier.

Upon finishing extraction of the related "design work name" by the relation searching unit 22c, the user interface processing unit 21 displays the "design work name" selected earlier, the "design work name" extracted by the relation searching unit 22c, and the relation (coupling) of them on the display device 12 (step S60).

FIGS. 20A to 20C are diagrams showing display examples of search results from the search processing. FIG. 20A shows a display example in which a "concept definition name" is selected first, and "external requirement names", "concept definition confirmation names", and an "external requirement confirmation name" are selected as desired types. FIG. 20B shows a display example in which a "detailed definition name" is selected first, and "internal requirement names" are selected as desired types. FIG. 20C shows a display example in which an "internal requirement name" is selected first, and then "internal requirement confirmation names" are selected as a desired type.

Thus, by the search processing, a design process pattern to be considered during designing is extracted from the design process data 6a recording a design process and displayed.

Incidentally, instead of the input device 10 and the display device 12, it may be configured to use an input device and a display device in a client apparatus as a communication counterpart of the communication device 8. In this case, data displayed on the screen is supplied from the user interface processing unit 21 to the communication device 8, and transmitted by the communication device 8 to the client apparatus. Data of an input operation by the user is received by the communication device 8 from this client apparatus, and is supplied from the communication device 8 to the user interface processing unit 21.

According to Embodiment 1 as described above, the design work recording unit 22a records an inputted "design work name" in the data storage device 6 as one of "external requirement name" 71, "concept definition name" 72, "internal requirement name" 73, "detailed definition name" 74, "external requirement confirmation name" 71a, "concept definition confirmation name" 72a, "internal requirement confirmation name" 73a, and "detailed definition confirmation name" 74a. The inter-work relation recording unit 22b records in the data storage device 6 the relation between two "design work names" selected from "external requirement name" 71, "concept definition name" 72, "internal requirement name" 73, "detailed definition name" 74, "external requirement confirmation name" 71a, "concept definition confirmation name" 72a, "internal requirement confirmation name" 73a, and "detailed definition confirmation name" 74a recorded in the data storage device 6. At this time, the inter-work relation recording unit 22b records only relation data limited in advance such as the relation between "external requirement name" 71 and "concept definition name" 72, the relation between "concept definition name" 72 and "internal requirement name" 73, the relation between "internal requirement name" 73 and "detailed definition name" 74, the relation between "external requirement name" 71 and "external requirement confirmation name" 71a, the relation between "concept definition name" 72 and "concept definition confirmation name" 72a, the relation between "internal requirement name" 73 and "internal requirement confirmation name" 73a, and the relation between "detailed definition name" 74 and "detailed definition confirmation name" 74a.

Accordingly, it is possible to provide a platform that allows to describe works performed by a designer unconsciously in a "design" process, such as "requirement", "definition", and "confirmation" in the narrow sense, as "concept definition name" 72, "concept definition confirmation name" 72a, "internal requirement name" 73, and "internal requirement confirmation name" 73a, while maintaining a series of flows in design works as relation data. Therefore, by a designer or the like inputting the contents of design works as "design work names" in this platform sequentially along a flow of thinking by the designer, the knowledge and the like in design processes in designer's mind are transformed into data accurately without omission.

Figure 28:
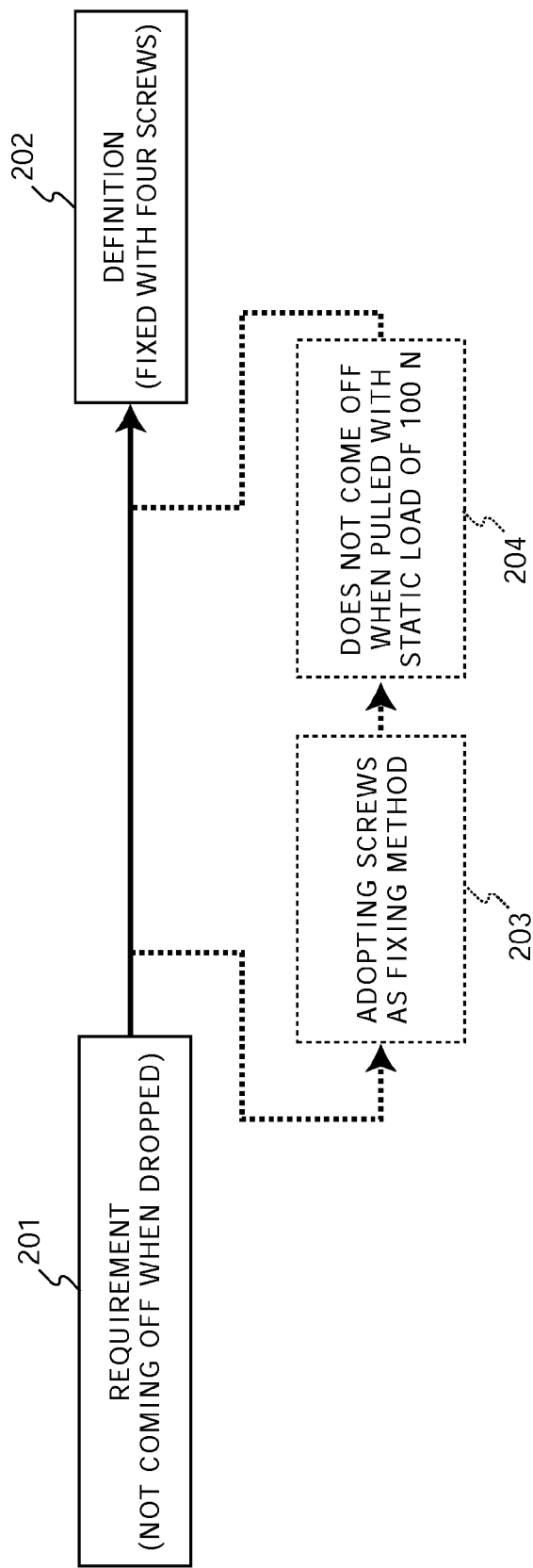
FIG. 28 is a diagram showing an example of describing a requirement and definitions based on the RDC model.

For example, in the case shown in FIG. 28, in the apparatus of above-described Embodiment 1, there are recorded the requirement 201 "not coming off when dropped" as an "external requirement name" 71, the work 203 "adopting screws as a fixing method" as a "concept definition name" 72, the work 204 "recognizing that it does not come off when pulled by a static load of 100 N" as an "internal requirement name" 73, and the definition 202 "fixing with four screws" as a "detailed definition name" 74.

Further, in Embodiment 1, in response to a predetermined operation, the user interface processing unit 21 changes the screen of the display device 12 to the input screen of "design work name" and changes, after a "design work name" is inputted, the screen of the display device 12 to the input screen of a relation between "design work names". The design work recording unit 22a then records "design work names" inputted to the input screen of "design work name" in the data storage device 6. Moreover, the inter-work relation recording unit 22b records in the data storage device 6 the relation between the "design work names" inputted to the input screen of relation between "design work names". Accordingly, the user inputs the "design work names", and thereafter inputs the relation between the "design work names". Thus, single design works and the relation therebetween are described separately, and the user can perform an input while organizing his/her thinking. Therefore, construction of design process data can be performed without a heavy load on the user as a designer.

Further, in Embodiment 1, the user interface processing unit 21 displays "design work names" inputted to the input screen of "design work name" on the input screen of a relation between "design work names"; and when one of the displayed "design work names" is selected and inputted, only "design work names" belonging to the type that can be related to the type of the selected "design work name" are displayed as selectable. This prohibits input of inappropriate relation, and thus design process data can be constructed accurately. Since an input of inappropriate relation is prohibited, the user can perform an input without puzzling. Therefore, construction of design process data can be performed without a heavy load on the user as a designer.

Further, in Embodiment 1, the relation searching unit 22c searches for a "design work name" related to one "design work name" selected from the "external requirement name" 71, the "concept definition name" 72, the "internal requirement name" 73, and the "detailed definition name" 74 recorded in the data storage device 6, based on the relation between "design work names". The user interface processing unit 21 then displays the search results by the relation searching unit 22c on the display device 12. Thus, a design process pattern that should be considered in designing is extracted and displayed. Accordingly, even if the designer is a beginner, the designer can confirm and learn a flow of design processes that should be considered in designing, based on the design process data 6a constructed by a skilled person. It is also possible for a designer or the like who inputted the data to check if there is any problem in construction of recorded data.

Further, in Embodiment 1, the relation searching unit 22c only extracts a "design work name" belonging to the type selected by the user. Accordingly, only a design work which the user focuses on is extracted out of a design process pattern that should be considered in designing and displayed.

Furthermore, in Embodiment 1, the following effects can be expected.

Things recorded in design works are only outcomes such as drawings and CAD data, and information of consideration and verification in designing is lost. Due to absence of such important information, it is not possible to measure the gap between the quality of design which is originally needed and the design which is actually made, and thus it is not possible to evaluate the degree of completion of design objectively. Lack of recording and verification of design processes causes to ship artificial objects with not-well-analyzed designs to a market, thereby leading to damages and losses such as occurrence of recall in our society.

In this Embodiment 1, it is possible to extract and record design information on consideration and verification that have been made and should be made in design processes. Furthermore, it is possible to support verification of appropriateness of design processes by displaying a part of design processes which have a complex network structure so that a person can easily understand without missing its context. Thus, it is possible to facilitate finding oversights in a design stage, such that what should be originally considered is not considered in a design of an artificial object, which cause critical events in the future.

Further, in this Embodiment 1, a young designer or the like can easily learn and master excellent design processes which have been implemented by a skilled designer.

Embodiment 2

Figure 21:
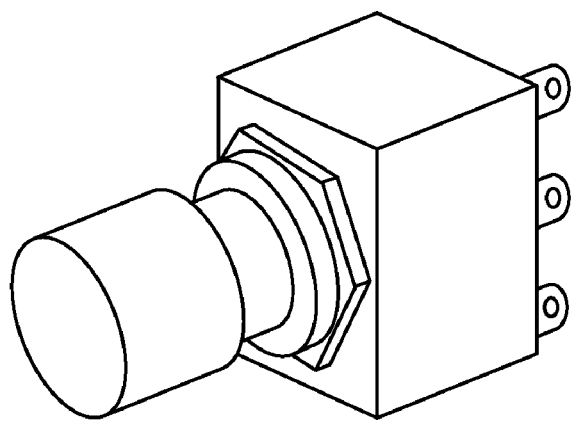
FIG. 21 is a view showing an overview of a switch product that is a design object in Embodiment 2.

In Embodiment 2 of the present invention, specific examples related to designing of a switch product will be described. FIG. 21 is a perspective view showing an overview of a switch product that is a design object in Embodiment 2. Note that the design process recording apparatus and its operation in Embodiment 2 are identical to those in Embodiment 1. In Embodiment 2, design process data 6a related to a switch product is constructed.

Hereinafter, details of (1) name input processing (step S1), details of (2) relation input processing (step S2), and details of (3) search processing (step S3) will be described related to designing of a switch product.

(1) Name Input Processing

Upon a predetermined operation, the user interface processing unit 21 changes the display screen of the display device 12 to the input screen of "adaptation object name" 31 (step S11).

FIGS. 22A to 22F are diagrams showing examples of the input screens of "adaptation object name" 31. As shown in FIG. 22A, in the input screen of "adaptation object name" 31, an input field 101 of product name and an input field 102 of "adaptation object name" 31 are displayed first. In FIG. 22A, there are inputted and shown text data of "switch" as a product name, and text data of "usage environment" as an "adaptation object name" 31. Here, if another "adaptation object name" 31 is inputted, then a new input field 103 is displayed as shown in FIG. 22B. Then text data is inputted and displayed in this input field 103. Thus, as shown in FIG. 22C, pluralities of "adaptation object names" 31 are inputted. Furthermore, if an "adaptation object name" 31 subordinate to the inputted "adaptation object names" 31 is inputted, then a new input field 104 for inputting the "adaptation object name" 31 in a subordinate layer is displayed as shown in FIG. 22D. Text data is then inputted and displayed in this input field 104. In this manner, pluralities of "adaptation object names" 31 are inputted hierarchically as shown in FIG. 22E. If a further subordinate "adaptation object name" 31 is inputted, then the user interface processing unit 21 displays a new input field for inputting the "adaptation object name" 31 in a subordinate layer, based on a similar operation. If text data is inputted and displayed in this input field, then the "adaptation object names" 31 are displayed hierarchically as shown in FIG. 22F for example.

The text data of the inputted product name and the "adaptation object name" 31 are stored once in the RAM 3 (step S12), and after the input is completed, they are stored in the data storage device 6 as the adaptation object table 41 in the design process data 6a (step S13). For the inputs shown in FIG. 22F, text data "usage environment", "user", "apparatus using", "product step", and so on are written as "adaptation object names" 31 in the adaptation object table 41 for the product name "switch".

Figure 23:
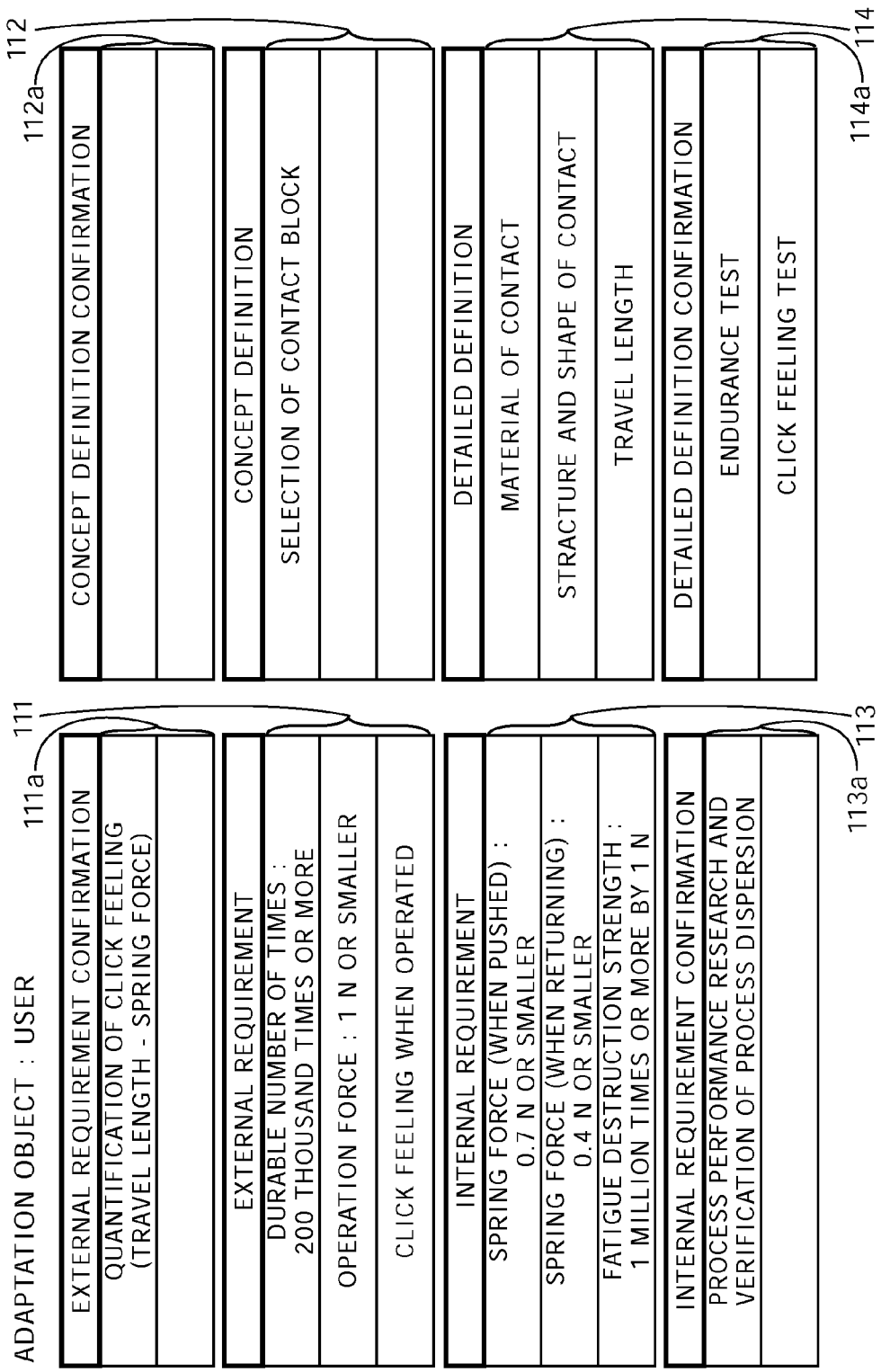
FIG. 23 is a diagram showing an example of an input screen of "design work name" in Embodiment 2.

When recording of "adaptation object names" 31 is completed, a list of "adaptation object names" 31 as shown in FIG. 22F for example is displayed (step S14). Upon selecting one of the "adaptation object names" 31 in the list (step S15), the display screen of the display device 12 changes to an input screen of "design work name" related to the selected "adaptation object name" 31 (step S17). FIG. 23 is a diagram showing an example of the input screen of "design work name". When a "user" is selected as an "adaptation object name" 31, as shown in FIG. 23, the display screen changes to the input screen of "design work name" for the "user". As shown in FIG. 23, in the input screen of "design work name", input fields 111 of "external requirement name" 71, input fields 111a of "external requirement confirmation name" 71a, input fields 112 of "concept definition name" 72, input fields 112a of "concept definition confirmation name" 72a, input fields 113 of "internal requirement name" 73, input fields 113a of "internal requirement confirmation name" 73a, input fields 114 of "detailed definition name" 74, and input fields 114a of "detailed definition confirmation name" 74a are displayed in one screen.

In FIG. 23, three pieces of text data of "durable number of times: 200 thousand times or more", "operation force of 1 N or smaller", and "click feeling when operated" are inputted and displayed as "external requirement names" 71 in the input fields 111. Text data of "quantification of click feeling (travel length—spring force)" is inputted and displayed as "external requirement confirmation name" 71a in an input field 111a. Text data of "selection of contact block" is inputted and displayed as a "concept definition name" 72 in an input field 112. Three pieces of text data of "spring force (when pushed): 0.7 N or smaller", "spring force (when returning): 0.4 N or smaller", and "fatigue destruction strength: 1 million times or more by 1 N" are inputted and displayed as "internal requirement names" 73 in the input fields 113. Text data of "process performance research and verification of process dispersion" is inputted and displayed as an "internal requirement confirmation name" 73a in an input field 113a. Three pieces of text data of "material of contact", "structure and shape of contact" and "travel length" are inputted and displayed as "detailed definition names" 74 in the input fields 114. Two pieces of text data of "endurance test" and "click feeling test" are inputted and displayed as "detailed definition confirmation names" 74a in the input fields 114a.

Thus, by this apparatus, a platform for inputting "design work names" so as to categorize them is provided to the user such as a skilled designer. The user operates the input device 10 to input contents of design works and so on corresponding to "external requirements" in the input field 111, and similarly input "design work names" related to other design works in other input fields 112 to 114, 111a to 114a. That is, in the platform provided by this apparatus, the types of "design work names" are sectioned appropriately, and thus the "design work names" are categorized into appropriate types by the user who is a skilled designer inputting proper "design work names" corresponding to the respective types of "design work names".

Specifically, upon an input to the input fields 111 to 114, 111a to 114a (step S18), each pieces of input data (text data) is stored once in the RAM 3 as one of "external requirement name" 71, "external requirement confirmation name" 71a, "concept definition name" 72, "concept definition confirmation name" 72a, "internal requirement name" 73, "internal requirement confirmation name" 73a, "detailed definition name" 74, and "detailed definition confirmation name" 74a, corresponding to the inputted input field (step S19).

Upon an input completion operation (step S20), the inputted "design work names" are separately stored into the external requirement table 42, the external requirement confirmation table 42a, the concept definition table 43, the concept definition confirmation table 43a, the internal requirement table 44, the internal requirement confirmation table 44a, the detailed definition table 45, and the detailed definition confirmation table 45a (step S21).

If inputted as in FIG. 23, for example, "external requirement names" 71 of three pieces of text data of "durable number of times: 200 thousand times or more", "operation force of 1 N or smaller", and "click feeling when operated" are recorded so as to be related to the "adaptation object name" 31 of text data of "user" as the external requirement table 42.

In this manner, the "adaptation object names" 31 and the "design work names" are recorded for the product name "switch" in the name input processing.

(2) Relation Input Processing

Upon finishing the name input processing, the list of "adaptation object names" 31 as shown in FIG. 22F is displayed on the display device 12 (step S31).

Upon selecting one of the "adaptation object names" 31 in the list (step S32), "design work names" related to this "adaptation object name" 31 are displayed in a list for every type of the "design work names" 31 (step S33). For example, if the "user" is selected as an "adaptation object name" 31, then it turns to the display screen as shown in FIG. 23.

Figure 24:
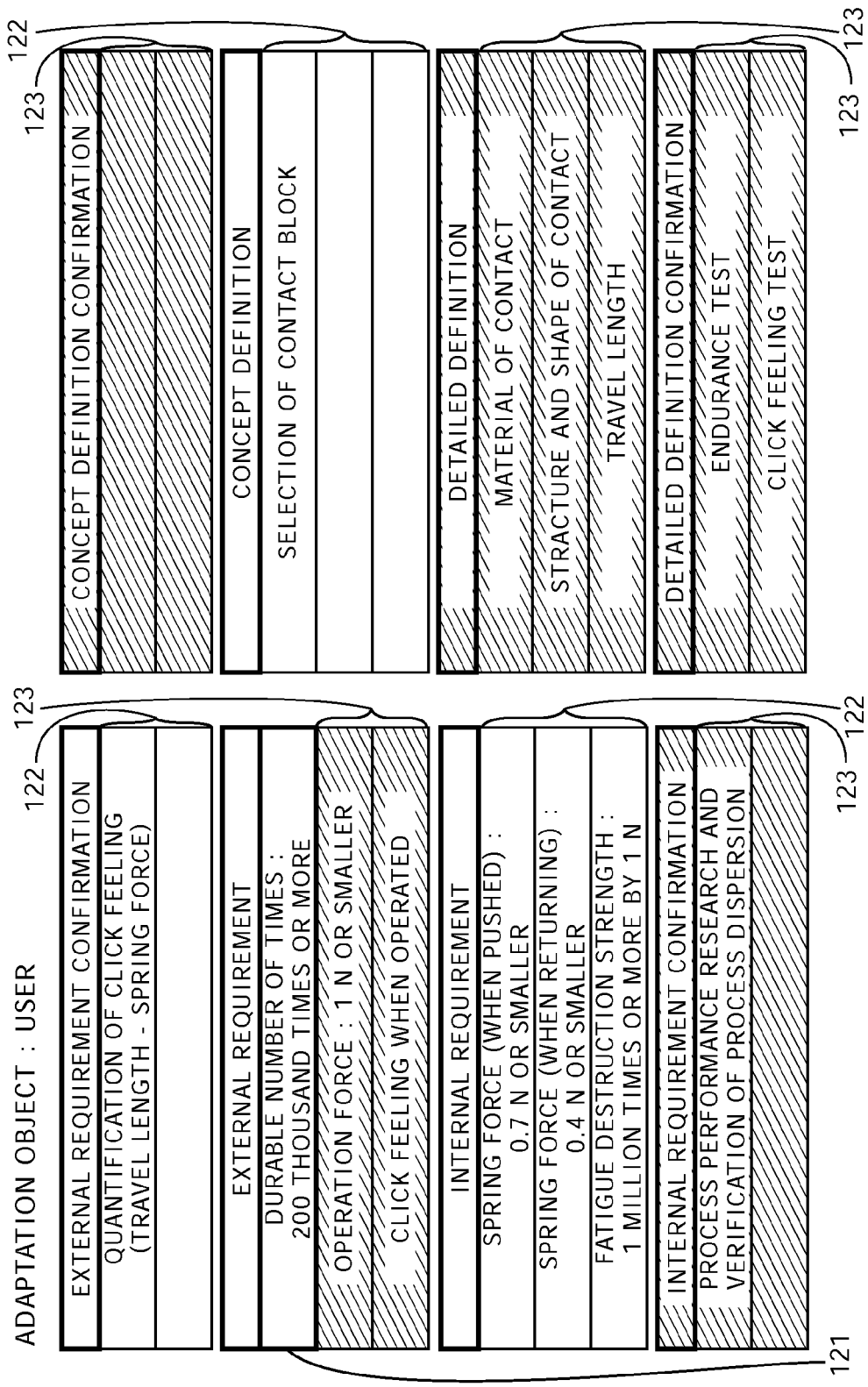
FIG. 24 is a diagram showing a display example of candidates of "design work names" in Embodiment 2.
Figure 25:
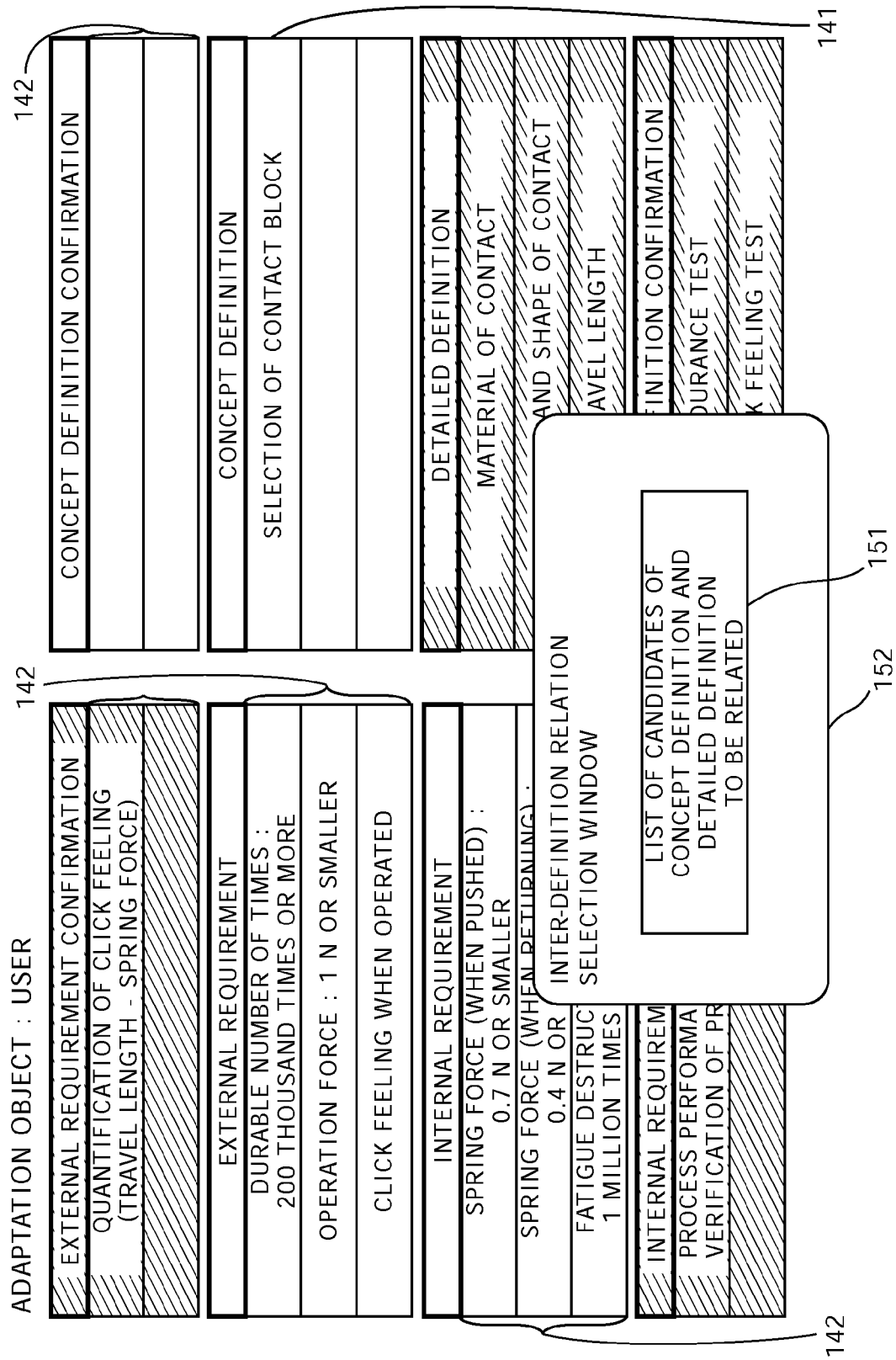
FIG. 25 is a diagram showing a display example of candidates of "design work names" in Embodiment 2.

Upon selecting one of the displayed "design work names" (steps S34, S35), a "design work name" which can be related to this "design work name" is displayed as a candidate of "design work name" to be related (steps S36, S37). FIG. 24 is a diagram showing a display example of candidates of "design work names" to be related. FIG. 25 is a diagram showing another display example of candidates of "design work names" to be related.

For example, if "durable number of times: 200 thousand times or more" 121 of "external requirement name" 71 is selected as one of two "design work names" to be related, then "design work names" 122 are displayed as selectable as shown in FIG. 24, which are belonging to the types of "design work names", i.e. "external requirement confirmation name", "concept definition name", and "internal requirement name" which can be related to the type of the "design work name", i.e. "external requirement name". The other "design work names" 123 are displayed in a non-selectable state by different luminance, color, and so on from those of the "design work names" 122.

For example, upon selecting "selection of contact block" 141 of "concept definition name" 72 first as one of the two "design work names" to be related as shown in FIG. 25, "design work names" 142 are displayed as selectable, which are belonging to the types of "design work names" which can be related to "concept definition name" as a type of a "design work name": "concept definition confirmation name", "external requirement name", and "internal requirement name". The other "design work names" 143 are displayed as non-selectable by different luminance, color, and so on from those of the "design work names" 142. Furthermore, since the "concept definition name" 72 is selected, all the "concept definition names" are extracted and displayed as a list 151 on another window 152.

When a "design work name" is selected from the selectable "design work names" 122, 142 (steps S38, S39), is generated data indicating a relation between the "design work name" selected earlier and the "design work name" selected later (that is, the value indicating the relation between them is 1).

When all inputs are completed (step S41), pieces of relation data between the inputted "design work names" are categorized and stored in the matrices 47 to 55 (step S42).

For example, as shown in FIG. 24, in the case where "durable number of times: 200 thousand times or more" 121 of "external requirement name" 71 is selected first, and then "design work name" 122 which is "fatigue destruction strength: 1 million times or more by 1 N" of "internal requirement name" 73 is selected, a value of an element corresponding to "durable number of times: 200 thousand times or more" and "fatigue destruction strength: 1 million times or more by 1 N" in the external requirement/internal requirement matrix 50 is set to 1 (that is, a value showing that there is a relation).

In this manner, a relation between "design work names" is recorded by the relation input processing.

(3) Search Processing

Upon a predetermined operation for starting search processing, a list of "adaptation object names" 31 based on the design process data 6a is displayed (step S51). Upon selecting one of the "adaptation object names" 31 in the list (step S52), the "design work names" related to this "adaptation object name" 31 are displayed as a list for every type of the "design work names" on the display device 12 (step S53). For example, if the "user" of "adaptation object name" 31 related to the above-described product name "switch" is selected, then a list of "design work names" is displayed as shown in FIG. 23. Upon selecting one of the "design work names" in the list (steps S54, S55), a list of the types of "design work names" having a possibility of being related to the selected "design work name" is displayed on the display device 12 (step S57).

Figure 26:
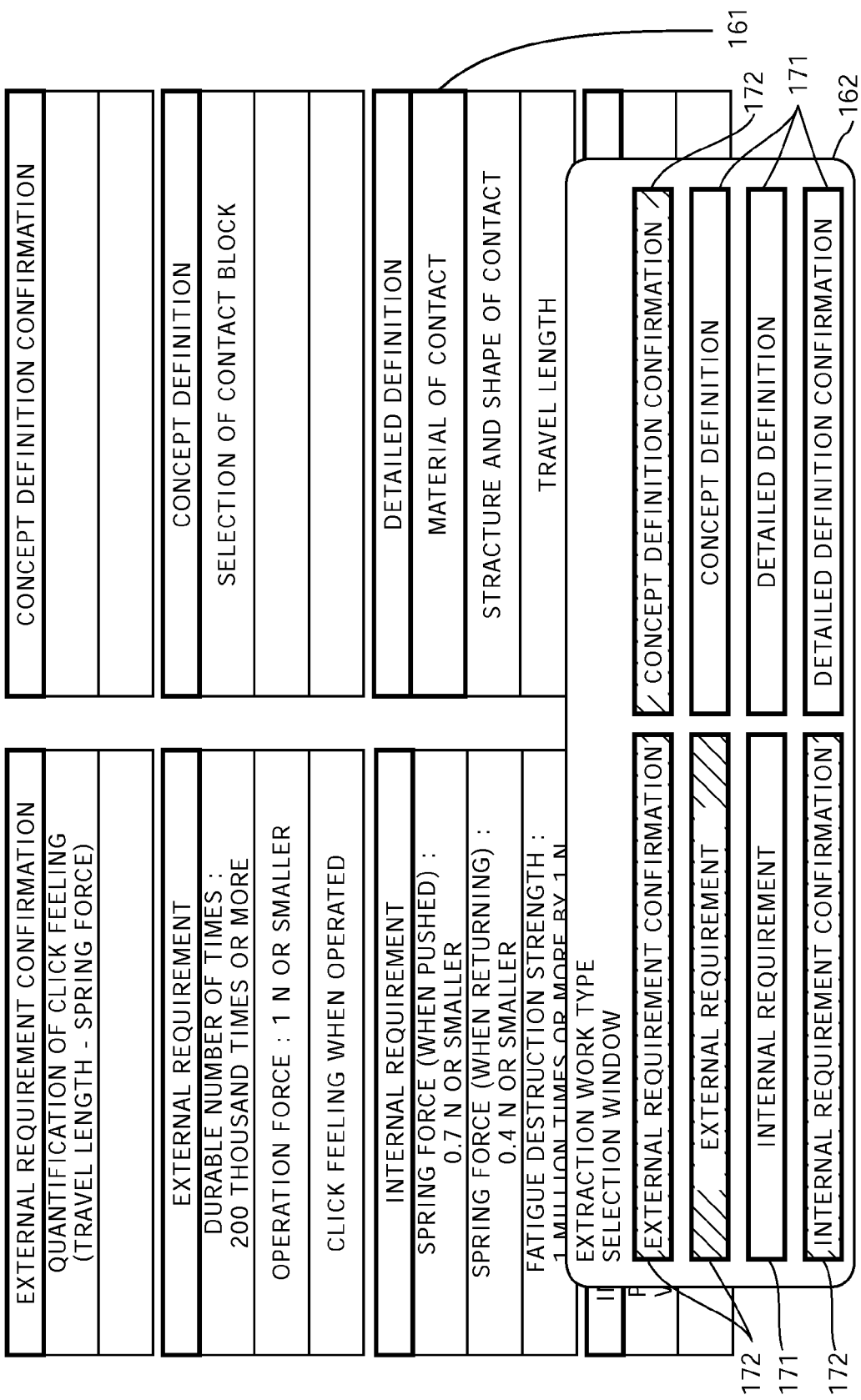
FIG. 26 is a diagram showing a display example of a type list of "design work names" in Embodiment 2.

FIG. 26 is a diagram showing a display example of a type list of "design work names". For example, if a "material of contact" 161 that is a "detailed definition name" 74 is selected, then an extraction work type selection window 162 is displayed on the display device 12 as shown in FIG. 26. In the extraction work type selection window 162, a type list of "design work names" is displayed. In this list, images 171 of types of "design work names" to be a selection candidate are displayed as selectable, and images 172 of types of the other "design work names" are displayed in a non-selectable state as an image having different luminance, color, and so on from those of the images 171. In this case, only the images 171 of "internal requirement name", "concept definition name", and "detailed definition confirmation name" which have a possibility of being related to the type of "design work name" that is "detailed definition name" are displayed as selectable.

Thus, when the type of "design work name" is selected after the list of types of "design work names" having a possibility of being related is displayed (step S58), are extracted only ones belonging to the selected type of "design work name" among the "design work names" related to the "design work name" selected earlier (the "material of contact" 161 in the above example).

When extraction of "design work name" is completed, the "design work name" selected earlier, the extracted "design work name", and their relation (coupling) are displayed on the display device 12 (step S60). For example, if the "material of contact" 161 is selected first, and the "internal requirement name" (that is, the image 171 of "internal requirement" in the extraction work type selection window 162) is selected as the type of "design work name", then only ones belonging to "internal requirement name" among the "design work names" related to the "material of contact" 161 are extracted based on relation data in the internal requirement/detailed definition matrix 49. Then text data of the "material of contact" 161, the extracted "design work name", and their relation (coupling) are displayed on the display device 12.

Figure 27:
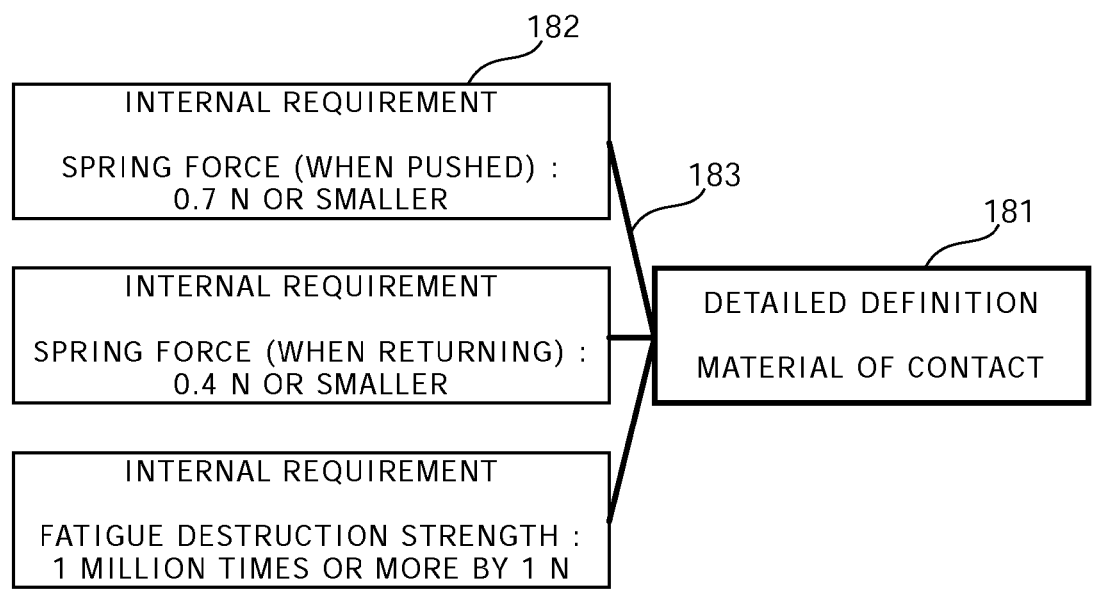
FIG. 27 is a diagram showing a display example of search results in Embodiment 2.

FIG. 27 is a diagram showing a display example of search results. Here, if "spring force (when pushed): 0.7 N or smaller", "spring force (when returning): 0.4 N or smaller", and "fatigue destruction strength: 1 million times or more by 1N" are extracted as ones belonging to the "internal requirement names", then text data 181 of "detailed definition—material of contact", text data 182 of "internal requirement—spring force (when pushed): 0.7 N or smaller", "internal requirement—spring force (when returning): 0.4 N or smaller", and "internal requirement—fatigue destruction strength: 1 million times or more by 1N", and coupling lines 183 coupling these displayed data are displayed on the display device 12.

In this manner, in the search processing, a design process pattern that should be considered in designing is extracted from the design process data 6a recording design processes, and is displayed.

It should be noted that although the above-described embodiments are preferred examples of the present invention, the present invention is not limited to them, and can be modified or changed in various ways within the range not departing from the essentials of the present invention.

For example, in the embodiments, the relation between "design work names" is represented by a binary value of 1 or 0; alternatively, it may be represented by any of serial values from 0 to 1 or three or more values corresponding to the relation. In this case, it may be arranged that this value is inputted by the user when inputting a relation, and is stored in the matrices 47 to 55. Further, it may be arranged that this value is displayed together as search results when performing the search processing.

Further, in the embodiments, the data storage device 6 is used as a recording medium which stores the design process data 6a; alternatively, may be used a portable recording medium, a recording medium existing on a computer network such as a file server, or the like.

INDUSTRIAL AVAILABILITY

The present invention is applicable to, for example, transforming of design processes by a skilled designer into a database.

EXPLANATION OF NUMERALS AND SYMBOLS

4a . . . design process input/output program (computer program); 6 . . . data storage device (recording medium); 12 . . . display device; 21 . . . user interface processing unit (user interface processing means); 22a . . . design work recording unit (design work recording means); 22b . . . inter-work relation recording unit (inter-work relation recording means); 22c . . . relation searching unit (searching means); 31 . . . adaptation object name; 71 . . . external requirement name; 72 . . . concept definition name; 73 . . . internal requirement name; 74 . . . detailed definition name; 75 . . . external requirement confirmation name; 76 . . . concept definition confirmation name; 77 . . . internal requirement confirmation name; 78 . . . detailed definition confirmation name

The invention claimed is:

1. A design process recording apparatus, comprising:

a design work recording means for recording in a recording medium an inputted design work name as one of plural types of design work names including external requirement names, concept definition names, internal requirement names, detailed definition names, external requirement confirmation names, concept definition confirmation names, internal requirement confirmation names, and detailed definition confirmation names; and an inter-work relation recording means for recording in the recording medium a relation between two design work names selected from one or more of the external requirement names, one or more of the concept definition names, one or more of the internal requirement names, one or more of the detailed definition names, one or more of the external requirement confirmation names, one or more of the concept definition confirmation names, one or more of the internal requirement confirmation names, and one or more of the detailed definition confirmation names recorded in the recording medium, wherein the external requirement names are data indicating external requirements, and each of the external requirements is a work by a designer of recognizing qualitatively or quantitatively an influence on a part or whole of an artificial object as a design object from an internal factor or an external environment of the artificial object, or is an influence thereof, wherein the concept definition names are data indicating concept definitions, and each of the concept definitions is a work of defining either of a structure of a part or whole of the artificial object that endures the influence in the external requirement and a structure of a part or whole of the artificial object depending on the influence in the external requirement, or is a matter as a work object thereof, wherein the internal requirement names are data indicating internal requirements, and each of the internal requirements is a work of defining a characteristic that a part or whole of the artificial object should realize, or is a characteristic thereof, wherein the detailed definition names are data indicating detailed definitions, and each of the detailed definitions is a work of defining a part or whole of the artificial object so that the characteristic defined in the internal requirement is realized, or is a matter as a work object thereof, wherein the external requirement confirmation names are data indicating external requirement confirmations, and each of the external requirement confirmations is a work of correcting vagueness of the influence recognized in the external requirement, wherein the concept definition confirmation names are data indicating concept definition confirmations, and each of the concept definition confirmations is a work of verifying whether or not the structure defined in the concept definition satisfies the external requirement, wherein the internal requirement confirmation names are data indicating internal requirement confirmations, and each of the internal requirement confirmations is a work of verifying the certainty of a characteristic defined in the internal requirement, wherein the detailed definition confirmation names are data indicating detailed definition confirmations, and each of the detailed definition confirmations is a work of verifying whether or not a part or whole of the artificial object defined in the detailed definition satisfies the internal requirement, and wherein the inter-work relation recording means records a relation between the external requirement name and the concept definition name, a relation between the concept definition name and the internal requirement name, a relation between the internal requirement name and the detailed definition name, a relation between the external requirement name and the internal requirement name, a relation between the external requirement name and the external requirement confirmation name, a relation between the concept definition name and the concept definition confirmation name, a relation between the internal requirement name and the internal requirement confirmation name, and a relation between the detailed definition name and the detailed definition confirmation name.

2. The design process recording apparatus according to claim 1, further comprising a user interface processing means for changing a screen of a display device to an input screen of the design work names in response to a predetermined operation, and changing the screen of the display device to an input screen of a relation between the design work names after the design work names are inputted, wherein the design work recording means records in the recording medium the design work names inputted to the input screen of the design work names, each as one of the plural types of design work names, and wherein the inter-work relation recording means records in the recording medium a relation between the design work names inputted to the input screen of a relation between the design work names.

3. The design process recording apparatus according to claim 2, wherein the user interface processing means displays, on the input screen of a relation between the design work names, the design work names inputted to the input screen of the design work names and, when one of the displayed design work names is selected and inputted, displays only the design work name belonging to a type which can be related to a type of the selected design work name; and the design work name is displayed as selectable.

4. The design process recording apparatus according to claim 1, wherein the design work recording means records the design work names for each of the adaptation object names, wherein the inter-work relation recording means records a relation between the design work names for each of the adaptation object names, wherein the adaptation object names are data showing adaptation objects, and each of the adaptation objects is an object to which the artificial object should adapt, and wherein the inter-work relation recording means records a relation between the concept definition or the detailed definition of a certain adaptation object name and the concept definition or the detailed definition of another adaptation object name.

5. The design process recording apparatus according to claim 4, further comprising a user interface processing means for changing a screen of the display device to an input screen of the adaptation object names in response to a predetermined operation, and after the adaptation object names are inputted, changing the screen of the display device to an input screen of the design work names related to the inputted adaptation object names, and changing the screen of the display device to a second input screen of a relation between the design work names after the design work names are inputted, wherein the design work recording means records in the recording medium, for each of the adaptation object names, the design work names inputted to the input screen of the design work names, each as one of the plural types of design work names, and wherein the inter-work relation recording means records in the recording medium, for each of the adaptation object names, a relation between the design work names inputted to the input screen of a relation between the design work names.

6. The design process recording apparatus according to claim 1, further comprising:

a searching means for retrieving based on a relation between the design work names one or more design work names related to one design work name selected from the external requirement names, the concept definition names, the internal requirement names, and the detailed definition names recorded in the recording medium; and a user interface processing means for displaying a search result by the searching means on a display device.

7. The design process recording apparatus according to claim 6, wherein the searching means extracts only a design work name belonging to a type selected by a user.

8. A design process recording method, comprising:

a design work recording step of recording in a recording medium an inputted design work name as one of plural types of design work names including external requirement names, external requirement confirmation names, concept definition names, concept definition confirmation names, internal requirement names, internal requirement confirmation names, detailed definition names, and detailed definition confirmation names; and an inter-work relation recording step of recording in the recording medium a relation between two design work names selected from one or more of the external requirement names, one or more of the concept definition names, one or more of the internal requirement names, one or more of the detailed definition names, one or more of the external requirement confirmation names, one or more of the concept definition confirmation names, one or more of the internal requirement confirmation names, and one or more of the detailed definition confirmation names recorded in the recording medium, wherein the external requirement names are data indicating external requirements, and each of the external requirements is a work by a designer of recognizing qualitatively or quantitatively an influence on a part or whole of an artificial object as a design object from an internal factor or an external environment of the artificial object, or is an influence thereof, wherein the concept definition names are data indicating concept definitions, and each of the concept definitions is a work of defining either of a structure of a part or whole of the artificial object that endures the influence in the external requirement and a structure of a part or whole of the artificial object depending on the influence in the external requirement, or is a matter as a work object thereof, wherein the internal requirement names are data indicating internal requirements, and each of the internal requirements is a work of defining a characteristic that a part or whole of the artificial object should realize, or is a characteristic thereof, wherein the detailed definition names are data indicating detailed definitions, and each of the detailed definitions is a work of defining a part or whole of the artificial object so that the characteristic defined in the internal requirement is realized, or is a matter as a work object thereof, wherein the external requirement confirmation names are data indicating external requirement confirmations, and each of the external requirement confirmations is a work of correcting vagueness of the influence recognized in the external requirement, wherein the concept definition confirmation names are data indicating concept definition confirmations, and each of the concept definition confirmations is a work of verifying whether or not the structure defined in the concept definition satisfies the external requirement, wherein the internal requirement confirmation names are data indicating internal requirement confirmations, and each of the internal requirement confirmations is a work of verifying the certainty of a characteristic defined in the internal requirement, wherein the detailed definition confirmation names are data indicating detailed definition confirmations, and each of the detailed definition confirmations is a work of verifying whether or not a part or whole of the artificial object defined in the detailed definition satisfies the internal requirement, and wherein in the inter-work relation recording step, there is recorded a relation between the external requirement name and the concept definition name, a relation between the concept definition name and the internal requirement name, a relation between the internal requirement name and the detailed definition name, a relation between the external requirement name and the internal requirement name, a relation between the external requirement name and the external requirement confirmation name, a relation between the concept definition name and the concept definition confirmation name, a relation between the internal requirement name and the internal requirement confirmation name, and a relation between the detailed definition name and the detailed definition confirmation name.

* * * * *